(12) United States Patent
Pillarisetti et al.

(10) Patent No.: US 8,689,194 B1
(45) Date of Patent: Apr. 1, 2014

(54) OPTIMIZATION IDENTIFICATION

(75) Inventors: Aravind Pillarisetti, Natick, MA (US); Peter Szpak, Newton, MA (US); Jesung Kim, Westborough, MA (US); Xiaocang Lin, Wayland, MA (US); Pieter J. Mosterman, Framingham, MA (US)

(73) Assignee: The MathWorks, Inc., Natick, MA (US)

(*) Notice: Subject to any disclaimer, the term of this patent is extended or adjusted under 35 U.S.C. 154(b) by 1605 days.

(21) Appl. No.: 11/894,388

(22) Filed: Aug. 20, 2007

(51) Int. Cl.
*G06F 9/45* (2006.01)

(52) U.S. Cl.
USPC .......................... 717/140; 717/146; 717/153

(58) Field of Classification Search
None
See application file for complete search history.

(56) References Cited

U.S. PATENT DOCUMENTS

| | | | | |
|---|---|---|---|---|
| 5,355,494 A * | 10/1994 | Sistare et al. | ............ | 717/154 |
| 5,418,959 A * | 5/1995 | Smith et al. | ............ | 717/151 |
| 5,956,512 A * | 9/1999 | Simmons et al. | ............ | 717/128 |
| 6,029,003 A * | 2/2000 | Moroda | ............ | 717/152 |
| 6,038,378 A * | 3/2000 | Kita et al. | ............ | 714/38.11 |
| 6,071,316 A * | 6/2000 | Goossen et al. | ............ | 717/126 |
| 6,247,174 B1 * | 6/2001 | Santhanam et al. | ............ | 717/154 |
| 6,249,911 B1 * | 6/2001 | Arimilli et al. | ............ | 717/151 |
| 6,286,135 B1 * | 9/2001 | Santhanam | ............ | 717/146 |
| 6,289,505 B1 * | 9/2001 | Goebel | ............ | 717/153 |
| 6,292,938 B1 * | 9/2001 | Sarkar et al. | ............ | 717/138 |
| 6,314,562 B1 * | 11/2001 | Biggerstaff | ............ | 717/156 |
| 6,363,523 B1 * | 3/2002 | Chen et al. | ............ | 717/153 |
| 6,442,752 B1 * | 8/2002 | Jennings et al. | ............ | 717/162 |
| 6,473,746 B1 * | 10/2002 | Zakrzewski | ............ | 706/15 |
| 6,622,300 B1 * | 9/2003 | Krishnaswamy et al. | ............ | 717/130 |
| 6,745,384 B1 * | 6/2004 | Biggerstaff | ............ | 717/156 |
| 6,880,149 B2 * | 4/2005 | Cronce | ............ | 717/126 |
| 7,036,111 B2 * | 4/2006 | Dollin et al. | ............ | 717/126 |
| 7,080,365 B2 * | 7/2006 | Broughton et al. | ............ | 717/146 |
| 7,117,484 B2 * | 10/2006 | Hartman et al. | ............ | 717/126 |
| 7,159,209 B1 * | 1/2007 | Srinivasan et al. | ............ | 717/126 |
| 7,159,212 B2 * | 1/2007 | Schenk et al. | ............ | 717/153 |
| 7,237,236 B2 * | 6/2007 | Kershenbaum et al. | ............ | 717/154 |
| 7,240,343 B2 * | 7/2007 | Ogasawara | ............ | 717/158 |
| 7,263,693 B2 * | 8/2007 | Heeb | ............ | 717/151 |
| 7,281,237 B2 * | 10/2007 | de Jong | ............ | 717/126 |
| 7,533,376 B2 * | 5/2009 | Anwar et al. | ............ | 717/146 |
| 7,810,080 B2 * | 10/2010 | Plum et al. | ............ | 717/140 |
| 2002/0038453 A1 * | 3/2002 | Riddle et al. | ............ | 717/151 |

(Continued)

OTHER PUBLICATIONS

"Using Synopsys Design Constraints (SDC) with Designer", Actel, 2001, <http://www.actel.com/documents/SDC_AN.pdf>, pp. 1-5.*

(Continued)

*Primary Examiner* — Thuy Dao
*Assistant Examiner* — Samuel Hayim
(74) *Attorney, Agent, or Firm* — Harrity & Harrity, LLP

(57) ABSTRACT

A computer readable medium including executable instructions that when executed perform a method for validating an optimization in generated code using an executable constraints document is provided. The medium can include instructions for relating an assumption to the optimization during code generation. The medium can include instructions for generating the executable constraints document during the code generation, the executable constraints document including information about the relating; and the medium can include instructions for executing the constraints document when the validating is performed, the validating including performing an operation based on a validation result produced by the validating, where the operation includes displaying the validation result to a user, storing the validation result, sending the validation result to a destination, or modifying the generated code.

25 Claims, 26 Drawing Sheets

(56) References Cited

U.S. PATENT DOCUMENTS

| | | | |
|---|---|---|---|
| 2002/0059564 A1* | 5/2002 | Bader | 717/140 |
| 2002/0059567 A1* | 5/2002 | Minamide et al. | 717/151 |
| 2002/0066088 A1* | 5/2002 | Canut et al. | 717/151 |
| 2002/0100014 A1* | 7/2002 | Iborra et al. | 717/104 |
| 2002/0138825 A1* | 9/2002 | Heeb | 717/148 |
| 2002/0178434 A1* | 11/2002 | Fox et al. | 717/106 |
| 2002/0194579 A1* | 12/2002 | Dollin et al. | 717/126 |
| 2003/0177472 A1* | 9/2003 | de Jong | 717/146 |
| 2003/0196191 A1* | 10/2003 | Hartman et al. | 717/126 |
| 2004/0064808 A1* | 4/2004 | Kira | 717/154 |
| 2004/0073895 A1* | 4/2004 | Schwabe et al. | 717/151 |
| 2004/0117766 A1* | 6/2004 | Mehta et al. | 717/121 |
| 2004/0199907 A1* | 10/2004 | Motokawa et al. | 717/140 |
| 2005/0071831 A1* | 3/2005 | Sheikh et al. | 717/151 |
| 2005/0172277 A1* | 8/2005 | Chheda et al. | 717/151 |
| 2006/0130021 A1* | 6/2006 | Plum et al. | 717/110 |
| 2007/0006188 A1* | 1/2007 | Schroth et al. | 717/140 |
| 2007/0006197 A1* | 1/2007 | Murphy et al. | 717/151 |
| 2007/0169050 A1* | 7/2007 | Barsness et al. | 717/151 |
| 2007/0219944 A1* | 9/2007 | Liu et al. | 707/2 |
| 2008/0034360 A1* | 2/2008 | Bodin et al. | 717/154 |

OTHER PUBLICATIONS

Toshikiyo Tanaka et al., "Approaches to Making Software Porting More Productive", IEEE, 1995, <http://ieeexplore.ieee.org/stamp/stamp.jsp?tp=&arnumber=494744>, pp. 1-13.*

Stephane Ducasse et al., "Traits: A Mechanism for Fine-Grained Reuse", ACM, 2006, <http://delivery.acm.org/10.1145/1120000/1119483/p331-ducasse.pdf>, pp. 1-58.*

* cited by examiner

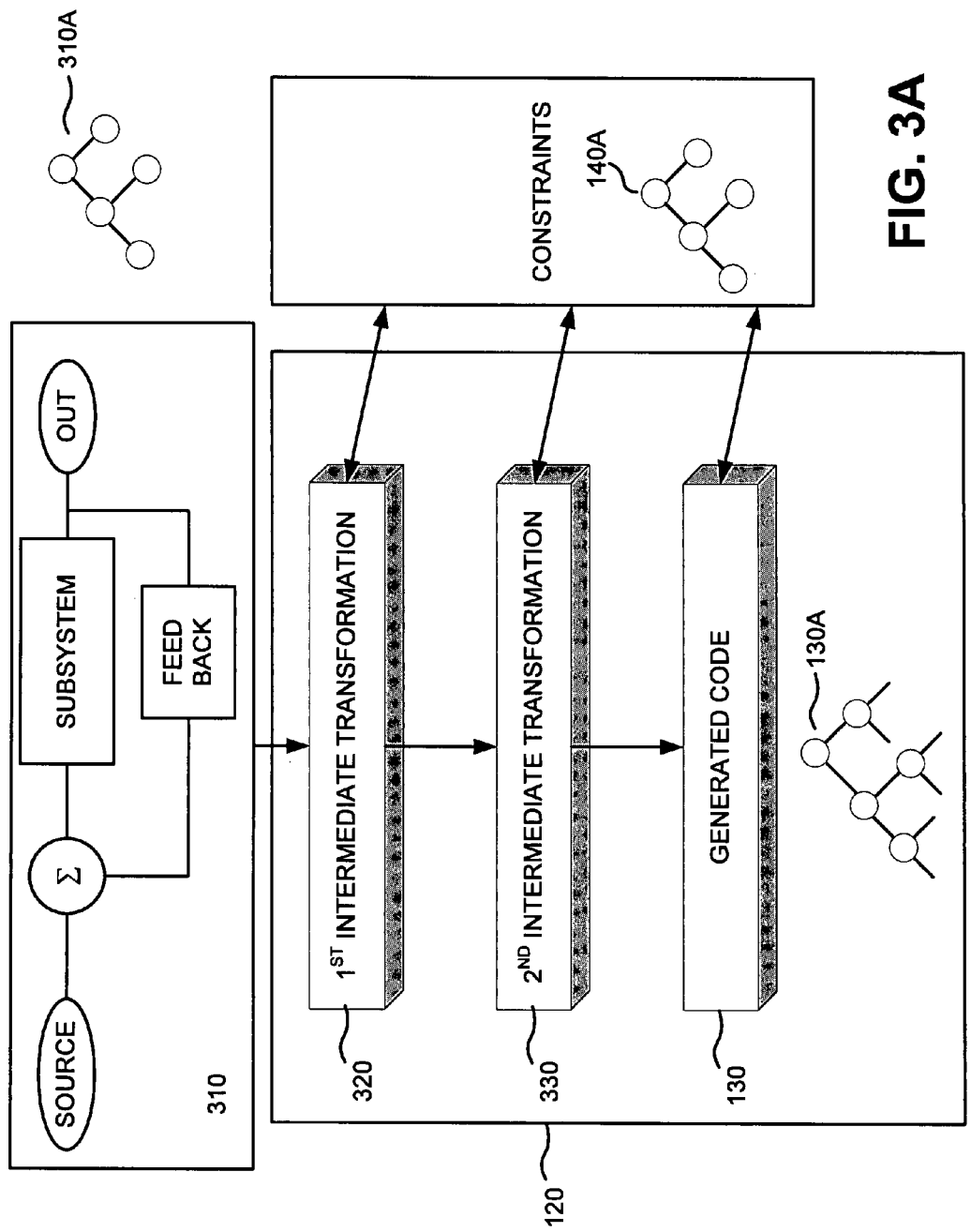

740

```
                CONTROLLER_REPORT.DOC

ASSUMPTIONS:
INPUT ALWAYS WITHIN ± V, WHERE V=5 VOLTS
NUMERATOR DIVIDED BY DENOMINATOR IS NEVER = 0
SIG 2 IS ALWAYS POSITIVE

OPTIMIZATIONS:
INPUT: REMOVE OUT-OF-BOUND DETECTION
TURNED OFF DIVIDE BY ZERO PROTECTION
SIG 2: TURNED OFF 0 CROSSING DETECTION

SAFEGUARDS:
NONE.  ALL SAFEGUARDS TURNED OFF

CHECKLIST LINK: CONTROLLER_CHECKLIST.DOC

ADDITIONAL REPORTING INFORMATION:

REPORT GENERATED USING DEPT. OF DEFENSE FORMAT 001 FOR
SAFETY CRITICAL APPLICATIONS

DOD-001 REPORT GENERATING COMPONENTS WERE USED TO
GENERATE THE REPORT.
```

```
33  /* Block signals (auto storage) */
34  typedef struct {
35      int32_T Gain;                    /* '<S1>/Gain' */
36  } BlockIO;
37
38  /* Block states (auto storage) for system '<Root>' */
39  typedef struct {
40      uint8_T X;                       /* '<Root>/X' */
41  } D_Work;
42
43  /* Zero-crossing (trigger) state */
44  typedef struct {
45      ZCSigState Amplifier_ZCE;        /* '<Root>/Amplifier' */
46  } PrevZCSigStates;
47
48  /* External inputs (root inport signals with auto storage) */
49  typedef struct {
50      int32_T Input;                   /* '<Root>/Input' */
51  } ExternalInputs;
52
53  /* External outputs (root outports fed by signals with auto s
54  typedef struct {
55      int32_T Output;                  /* '<Root>/Output' */
56  } ExternalOutputs;
57
```

```
80    /* Model initialize function */
81    void rtwdemo_counter_initialize(void)
82    {
83      /* Registration code */
84
85      /* initialize error status */
86      rtmSetErrorStatus(rtM, (const char_T *)0);
87      rtPrevZCSigState.Amplifier_ZCE = POS_ZCSIG;
88    }
```

```
80    /* Model initialize function */
81    void rtwdemo_counter_initialize(void)
82    {
83      /* Registration code */
84
85      /* initialize error status */
86      rtmSetErrorStatus(rtM, (const char_T *)0);
87
88      /* block I/O */
89      (void) memset(((void *) &rtB),0,
90                    sizeof(BlockIO));
91
92      /* states (dwork) */
93      (void) memset((char_T *) &rtDWork,0,
94                    sizeof(D_Work));
95
96      /* external inputs */
97      rtU.Input = 0;
98
99      /* external outputs */
100     rtY.Output = 0;
101     rtPrevZCSigState.Amplifier_ZCE = POS_ZCSIG;
102   }
```

```
/* Model Verification Function */
void rtwdemo_counter_initialization_self_diagnostic(void)
{
  /* Validate "Remove internal state zero initialization"
   * is employed.
   */
  utAssert(rtB.Gain == 0);
  utAssert(rtDWork.X == 0);

/* Validate "Remove root level I/O zero initialization"
   * is employed.
   */
  utAssert(rtU.Input == 0);
  utAssert(rtY.Output == 0);
}
```

FIG. 17

```
/* Model Verification Function */
void rtwdemo_counter_sample_time_self_diagnostic(void)
{
    static real_T prevT;
    real_T currentT;

/* Validate "fundamental sample time"
     * is correct.
     */
    currentT = ssGetT(rtM);
    deltaT = currentT - prevT;
    utAssert(ftabs(deltaT - 1.0) < 0.0001);
    prevT = currentT;
}
```

FIG. 19

OPTIMIZATION IDENTIFICATION

BACKGROUND INFORMATION

Certain applications, such as system design applications, may require that code be generated. For example, an engineer may need to generate executable code to run on a target system when designing an application for the target system. The engineer may generate a specification that includes assertions about how the code will perform. For example, the specification may include an assertion that an input signal for the generated code will not exceed ±1 volt. A code generator used by the engineer may perform an optimization, such as removing input voltage saturation checking, since the assertion indicates that the input voltage will remain within a certain range.

The generated code may operate on the target system as expected since the generated code was designed specifically for the target system. At some time later, the generated code may be installed on another target system, such as a newer version of the target system previously used to run the generated code. The engineer that designed the code based on certain assumptions may no longer be involved with the code, and therefore, assumptions made by the engineer and/or optimizations made by the code generator may not be available to persons working with the new target system and the generated code.

Since assumptions, optimizations and/or other features related to the generated code may not be readily known, the generated code run on the new target system may need to undergo extensive testing in order to verify that the generated code operates properly. In some situations, diagnostic information may be available for the generated code to assist with code verification. For example, a human-readable document may include information about static validations for a portion of the generated code. This static diagnostic information may be inadequate to validate the generated code since the diagnostic information may not be useable for runtime validation of the generated code (e.g., the diagnostic information may only be relevant to static behavior of the generated code).

Testing and verification in systems, such as complicated systems, can be very costly and may take many days or months to perform since operator based testing may be time consuming and static diagnostic information may be inadequate to perform complete validations of generated code. As a result, productivity may decrease and costs may increase when generated code is used on systems that can differ from a configuration of a system on which the generated code was originally designed to operate.

SUMMARY

In accordance with an embodiment, a computer readable medium including executable instructions that when executed perform a method for validating an optimization in generated code using an executable constraints document is provided. The medium can include instructions for relating an assumption to the optimization during code generation, where the code generation produces generated code. The medium can include instructions for generating the executable constraints document during the code generation, the executable constraints document including information about the relating; and the medium can include instructions for executing the constraints document when the validating is performed, the validating including performing an operation based on a validation result produced by the validating, where the operation includes displaying the validation result to a user, storing the validation result, sending the validation result to a destination, or modifying the generated code.

In accordance with another embodiment, a method for validating functional code in generated code using a document that includes executable content is provided. The method may include relating an assumption or an assertion to an optimization during code generation that produces generated code, where the assertion, assumption, or optimization are included in the functional code. The method may include generating the document during the code generation, where the document includes information about the relating in the executable content. The method may include validating at least a portion of the functional code using the information, where the validating is performed dynamically, and wherein the validating further produces validation information. The method may include displaying the validation information to a user, storing the validation information in a storage device, sending the validation information to a destination that performs an operation based on the validation information, or modifying the generated code based on the validation information.

In accordance with yet another embodiment, a device for documenting generated code is provided. The device may include first logic to generate code that includes an assertion, and generate an executable document that maps an assumption to the assertion, where the executable document validates the generated code with respect to a new target device based on the mapping. The device may include second logic to store the generated code or the executable document, send the generated code or the executable document to the new target device, or display the generated code or the executable document to a user.

In accordance with still another embodiment, a computer readable medium including executable instructions for operating a user interface that interacts with a user is provided. The medium can include instructions for receiving a user input related to generating code for a target device, where the code generating generates functional code and an executable constraints document that maps an assumption to an assertion, where the assertion is in the generated code. The medium may include instructions for displaying information about the generated code to the user in response to the user input, the displayed information mapping the assumption to the assertion in the generated code to validate the generated code with respect to the target device or with respect to a new target device.

In accordance with yet another embodiment, a system for validating generated code is provided. The system may include means for generating code from a specification to produce generated code and means for generating an executable constraints document during the generating. The system can include means for storing the generated code or the executable constraints document and means for validating the generated code using the executable constraints document. The system can include means for displaying, storing, or sending a validation result to a user, a storage medium, or a destination, respectively.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 3A illustrates an exemplary technique for generating code from a diagram;

FIG. 7C illustrates an exemplary user interface that can display a report related to generated code;

FIG. 13 illustrates generated code that can be produced from the graphical model of FIG. 12;

FIG. 14 illustrates exemplary initialization code that can be generated from the graphical model of FIG. 12;

FIG. 16 illustrates generated code that can be created using the user interface of FIG. 15;

FIG. 17 illustrates exemplary diagnostic code that can be generated for the graphical model of FIG. 12 using the user interface of FIG. 15;

FIG. 19 illustrated exemplary executable code that can be called to verify generated code.

DETAILED DESCRIPTION

Overview

Figure 1A:
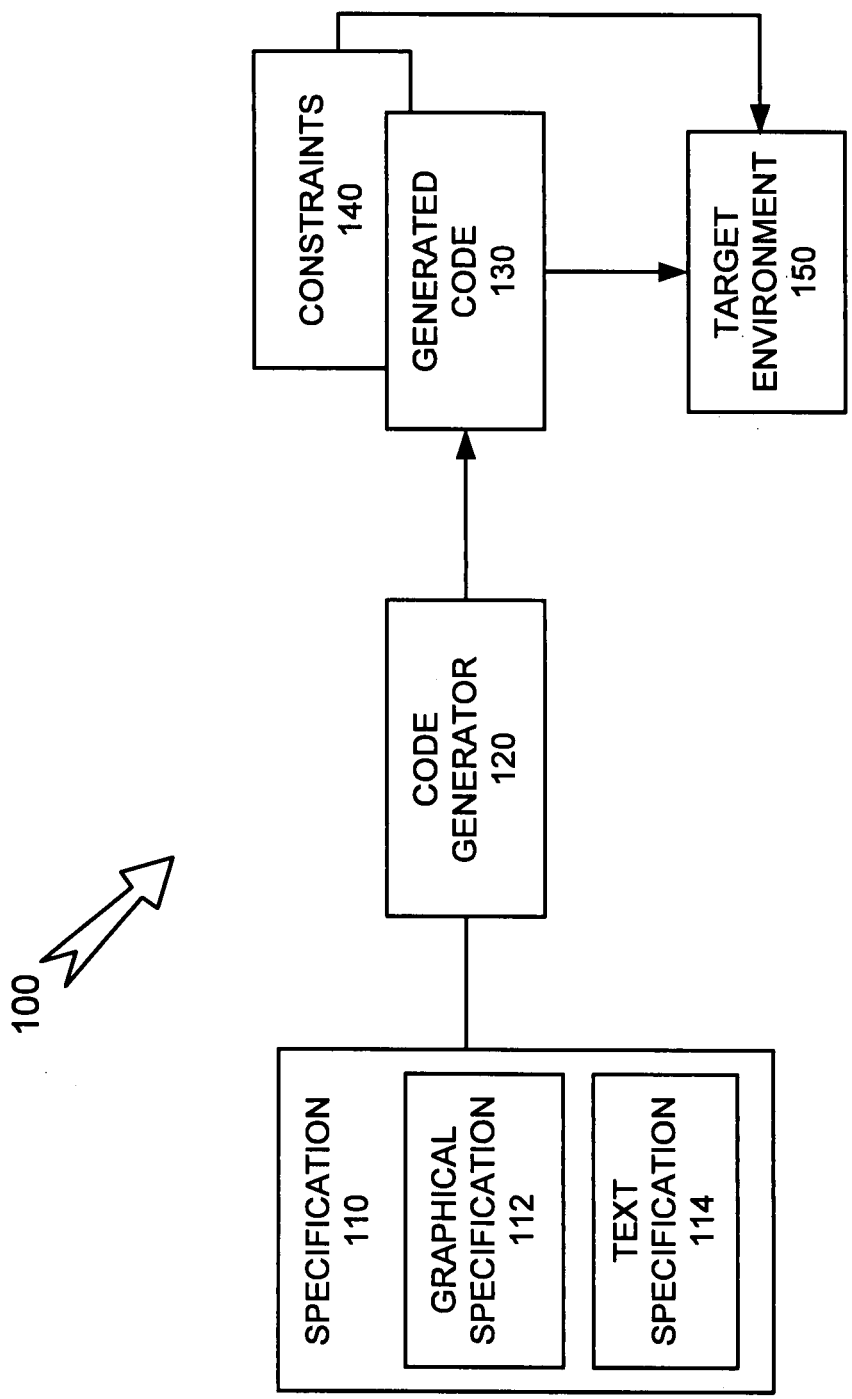
FIG. 1A illustrates an exemplary system that can be used to practice an exemplary embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Conventional code generators may not be capable of documenting generated code in a way that allows assumptions, assertions, optimizations, etc., to be accurately identified and/or validated at, for example, runtime. For example, a database may contain generated code that was created to run on version 1 of a target device (target 1), where version 1 is no longer in production. An operator, such as an engineer, may need to run the generated code on another target system that is currently in production. For example, version 2 of the target system (target 2) may be a replacement for target 1. The engineer may need to verify that code generated for target 1 operates correctly on target 2 before target 2 can be put into production.

The conventional code generator may not provide the engineer with documentation that accurately identifies (static or runtime) assumptions, assertions, optimizations, etc., associated with the generated code and/or that allows runtime validation of the generated code. As a result, the engineer may have to perform exhaustive testing of the generated code on target 2, or the engineer may not be able to use the generated code at all (e.g., if target 2 is a safety critical application that can only be used when stringent safety, testing, reliability, etc., criteria are met).

Exemplary embodiments, disclosed hereinbelow, document generated code in a way that allows assumptions, assertions, optimizations, proof objectives, etc., to be captured in a way that allows features of the generated code to be identified and/or validated statically and dynamically (e.g., allows optimizations to be validated prior to runtime or at runtime). Referring to the example above, an exemplary embodiment may produce generated code for target 1 along with a separate document (e.g., an executable file, an object, etc.), where the document contains information (e.g., meta data) about assumptions, assertions, optimizations, proof objectives, etc., that are reflected in the generated code.

In one embodiment, the executable document may include self-diagnostic code that is run to validate generated code. The executable document may include information, such as assumptions, assertions, optimizations, etc., in the document may be in a format that supports identification and/or validation of specific portions of the generated code at runtime. In one embodiment, the executable document may include code that can be executed to observe the behavior of generated code when the generated code is run. As a result, exemplary embodiments allow runtime validation of generated code. In another embodiment, the executable document can include links that can be used to associate content in the document (e.g., assertions) with features in the generated code (e.g., optimizations) to allow information in the generated code to be mapped back to a source, such as a specification that was used to produce the generated code. In still another embodiment, the document may include an executable portion that can be run to observe the generated code and a second portion that may include text that can be used by an operator to understand portions of the generated code, the executable portion of the document, or portions of a source document/file (e.g., a specification that was used to produce the generated code).

Still referring to the example, the engineer can retrieve generated code from the database and run the code on target 2 knowing what assumptions, assertions, optimizations, etc., went into the generated code. The engineer can use information produced by the executable document to map the generated code to specifications related to target 2, to operational requirements for target 2, etc. Use of the executable document allows the engineer to quickly and accurately determine whether the generated code will operate in a determined manner on target 2. The engineer may make the determination without having to perform exhaustive testing and/or without requiring that the engineer regenerate code for target 2 as might be required using conventional techniques. For example, executing the document may indicate that an optimization was made the generated code based on an expected input signal to target 1. The executable document may further validate that target 2 can handle the expected input without saturating or overloading input logic (e.g., an input interface) on target 2.

Exemplary embodiments may generate various types of documents for generated code depending on requirements for a particular implementation. For example, a document may be a text document that includes information (e.g., descriptions) that can be used by the engineer for identifying, validating, verifying, etc., portions of generated code and/or assumptions, assertions, etc., related to the portions of generated code. In another embodiment, the document may include executable code that operates as an observer of the generated code, where the executable code in the document can be used to identify, validate, verify, etc., portions of the generated code and/or assumptions, assertions, etc., related to the portions of generated code.

Exemplary embodiments may generate a document that is executed in whole (e.g., an executable document) or may generate a document that contains information, a portion of which is executable (e.g., a partially executable document). The executable code in the document may further include, or may be used with, checklists, reports, specifications, etc., that can be used by the engineer, other persons, devices (e.g., a code auditing device), etc. The executable code may further indicate that the optimization in the generated code is, or is not, valid for target 2. Exemplary embodiments may further generate substantially any number of executable documents or partially executable documents without departing from the spirit of the invention. For example, a first document may document a first portion of generated code (e.g., the first document may be a partially executable document) and a second document may document a second portion of the generated code (e.g., the second document may be an executable document).

Exemplary embodiments may validate and/or document generated code without requiring that modifications be made to information input to the code generator. For example, a specification may operate as an input to a code generator. An exemplary embodiment may generate a constraints document that includes executable information that can be used to validate the generated code by mapping portions of the generated code back to portions of the specification without requiring that a user insert special commands, characters, etc., into the specification prior to code generation. The constraints document may be an executable document or may be a document that includes some executable information (e.g., executable code). Exemplary embodiments may validate/document generated code unobtrusively since modifications to specifications are not required when generating code. Exemplary embodiments may further produce a constraints document that includes constraints and/or assumptions generated by the code generator itself. For example, a code generator may generate constraints and/or assumptions that can be used for a first scheduler associated with target 1 and a second scheduler that is associated with target 2.

Exemplary executable documents that self-verify or self-diagnose generated code may identify substantially any type of information contained in the generated code. For example, in addition to previously discussed optimizations, assumptions, and/or assertions, information, such as, but not limited to, performance characteristics, thread information (e.g., information about thread safety), power consumption, platform dependent decisions (e.g., integer widths, global memory initialization, etc.) may be verified and/or validated using an executable document.

Exemplary embodiments may capture assumptions, assertions, constraints, proof objectives, etc., from graphical and/or text sources. For example, one embodiment may capture information from a graphical diagram and may store the information in an executable document. In one implementation, the graphical diagram may include graphical representations (e.g., blocks, icons, images, etc.) that can capture assertions, assumptions, proof objectives, etc. This implementation may capture information from these graphical representations and may store the information in an executable document and/or a partially executable document that holds self-diagnostic code for the graphical diagram. A second embodiment may capture information from a text based model and may store the information in an executable document and/or a partially executable document.

Exemplary System

FIG. 1A illustrates an exemplary system 100 that can be configured to practice an exemplary embodiment. System 100 may include specification 110, code generator 120, generated code 130, constraints 140 and target environment 150 (hereinafter target 150). System 100 is illustrative and other implementations can take other forms. For example, an alternative implementation of system 100 may have fewer components, more components, or components in a configuration that differs from the configuration of FIG. 1A. The components of FIG. 1A and/or other figures describe herein, may be implemented in hardware based logic, software based logic and/or logic that is a combination of hardware and software based logic (e.g., hybrid logic); therefore, the components of FIG. 1A and/or other figures herein are not limited to a specific type of logic.

Specification 110 may include logic that contains information that can be provided to code generator 120 to produce generated code 130 and/or constraints 140. For example, specification 110 may include text, a diagram (e.g., a block diagram), etc. In one embodiment, specification 110 may include graphical specification 112 and/or text specification 114. Graphical specification 112 may include graphical information, such as a graphical diagram (e.g., a block diagram) and text specification 114 may include text information, such as a document, text-based code received from a text editor, etc. Specification 110 can include information entered by a user or information generated by a device, such as a device that automatically generates a block diagram based on input instructions and/or input data.

In an embodiment, specification 110 may be created in response to an objective, such as an objective that identifies one or more desired outcomes that should be achieved when specification 110 is used. Specification 110 may further include assumptions that can act as constraints in specification 110 and/or in downstream code and/or devices, such as downstream code generated using specification 110 and/or in downstream devices like code generator 120, target 150 and/or other types of downstream devices (not shown in FIG. 1A).

Assumptions can take many forms, such as, but not limited to, integer widths (e.g., 8, 16, 32, etc., bit widths), fixed point computation, floating point computation, variable widths, hardware features and/or capabilities, memory resetting or initialization, rate information (e.g., sampling rate, clock rate, etc.), etc. Assumptions may further be associated with data structures in generated code, functions and/or function signatures in generated code, sequencing of functions in generated code, and/or tasks associated with functions in generated code. Assumptions may apply to an entire specification 110 or to portions of specification 110. For example, an assumption may apply to an entire model or to one or more subsystems in the model. Assumptions may further be arranged in hierarchies within specification 110 if desired. Exemplary embodiments may capture assumptions in a graphical model using blocks, text, etc., depending on a particular configuration of specification 110. For example, mechanisms within the model may be used to capture the assumptions. In an alternative implementation, mechanisms outside the model (i.e., mechanisms that are disassociated from the model) may be used to relate assumptions to the model.

Embodiments of specification 110 may include still other types of information, such as execution semantics and/or scheduling semantics. For example, execution semantics can include code that identifies sequences in which functions or other types of code are called and/or information indicating whether portions of specification 110 are single rate and/or multi-rate, etc. Scheduling semantics may include information that identifies how portions of specification 110 (e.g., elements within a block diagram) should be scheduled for proper operation (e.g., proper execution of the block diagram). Scheduling semantics may further specify types of schedules that can be used with specification 110, code generator 120, target 150, etc. (e.g., a rate-monotonic scheduler, an earliest deadline first scheduler, etc.). Other embodiments of specification 110 may include still other types of information, such as executable requirements, proof objectives, etc., depending on particular configurations of system 100.

Code generator 120 may include logic that converts specification 110 into generated code 130. For example, specification 110 may be in a first format, such as a block diagram format, and code generator 120 may transform the block diagram format into another format, such as a source code format that can be run in target 150. For example, code generator 120 may transform a block diagram into a source code format, such as C, C++, assembly language, hardware description language (HDL), etc.

Code generator 120 may perform a number of operations (e.g., transformations) when converting specification 110 into generated code 130. For example, in one embodiment, code generator 120 may convert specification 110 into a number of intermediate representations by performing intermediate transformations on portions of specification 110. For example, code generator 120 may perform a first intermediate transformation to combine certain blocks from a diagram into a single block and a second transformation to label connections to/from blocks with data type information. Embodiments of code generator 120 may be self-contained in that code generator 120 does not require information from other devices, objects, applications, etc., while performing code generation; or, code generator 120 may not be self-contained and may accept information from other devices, objects, applications, etc., while performing code generation.

Embodiments of code generator 120 may generate code for specific devices, environments, etc., such as target 150. For example, code generator 120 may use information about target 150 (e.g., integer widths, shift behavior, memory initialization information, etc.) when creating generated code 130. Code generator 120 may use information about target 150 to ensure that generated code 130 operates in a determined manner when executed on target 150. For example, embodiments of code generator 120 may generate assumptions, constraints, etc., internally when generating code to help ensure generated code 130 operates on target 150 and/or code generator 130 may receive assumptions, constraints, etc., from other logic (e.g., code, devices, etc.) or from a user.

Generated code 130 may include machine-executable instructions that are generated by code generator 120 and/or another device (not shown in FIG. 1A). Generated code 130 may be in a human-readable form (e.g., source code) that can be processed by a device, or generated code may be in a format that is not easily interpreted by a human (e.g., binary code). In one embodiment, generated code 130 may include information that can be used to diagnose code that is used to perform operations in target 150, such as compiler directives, assertion statements, etc. In another embodiment, generated code 130 may not include information that can be used to diagnose code that performs operations on target 150. Embodiments of generated code 130 may be run on devices, such as target 150 and/or other types of devices.

Constraints 140 may include information that is used to verify and/or diagnose generated code 130. For example, constraints 140 may be an executable file that includes information that can be used to make determinations with respect to generated code 130 when the constraints 140 is executed. In one embodiment, constraints 140 can be a file that allows diagnosing generated code 130 statically or dynamically (e.g., at runtime). For example, executable code in constraints 140 may include information that allows assumptions in generated code 130 to be identified, evaluated, etc. Assume, for sake of example, that code generator 120 produces generated code 130 using an assumption that integers have a width of 16 bits, where the integer width was determined based on information about target 150. Constraints 140 may include information that indicates that generated code 130 is configured for an environment that uses 16 bit integers.

Constraints 140 can include substantially any type of information that can be used to make a determination with respect to generated code 130. For example, constraints 140 can include runtime information that can be used to make determinations with respect to generated code 130 as generated code 130 executes; information about assertions that have links to features (e.g., optimizations, etc.) in generated code 130; information about constraints imposed by generated code 130; information about emulators that allow generated code 130 to be run on environments having characteristics that differ from characteristics of target 150; etc.

Constraints 140 can be in substantially any format, such as hypertext markup language (.html), extensible markup language (.xml), executable (.exe), and/or other types of formats (e.g., .c, .Java, .mat, .cxx, .log, .s, etc.). Constraints 140 may further be generated and/or stored in still other forms. For example, constraints 140 may be a software object that can be used in system 100 to document generated code 130. In still another embodiment, constraints 140 can include a first portion that is executable and a second portion that is in another format amenable to interpretation by a user, such as such text (.txt), Microsoft Word (.doc), etc. The first portion and second portion of constraints 140 can be in the same file or may be in separate files that are related to each other (e.g., via a link, pointer, filename, etc.). Constraints 140 may be associated with generated code 130 in substantially any number of ways, such as appended to generated code 130; linked to generated code 130; embedded in generated code 130, etc.

Figure 1B:
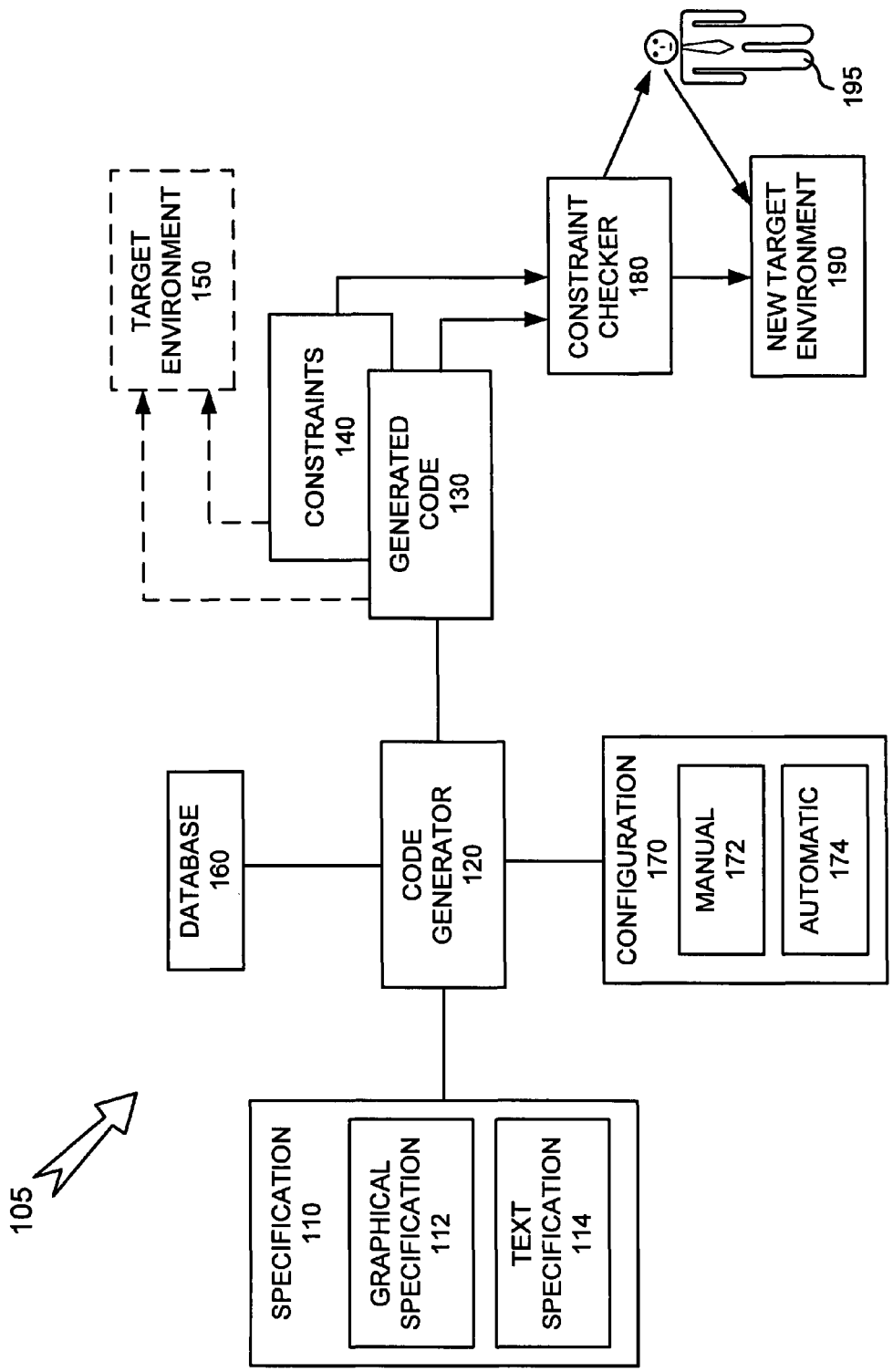
FIG. 1B illustrates an alternative exemplary system that can be used to practice an exemplary embodiment.

FIG. 1B illustrates an alternative exemplary system 105 that can be used to practice an exemplary embodiment. System 105 is illustrative and other implementations can take other forms. System 105 can include specification 110, code generator 120, generated code 130, constraints 140, target 150, database 160, configuration 170, constraint checker 180, new target environment 190 (hereinafter new target 190), and user 195. Specification 110, code generator 120, generated code 130, constraints 140, and target 150 may operate as described in connection with FIG. 1A. In system 105, target 150 may be optional as indicated by the dashed line.

Database 160 may include logic that contains information that can be used by code generator 120 to generate code. For example, database 160 may include a computer-readable medium that stores user information (e.g., information identifying authorized users), temporary results (e.g., intermediate representations), information about target devices (e.g., parameter information, address information, etc.), assumptions, assertions, etc.

Configuration 170 may include logic that includes information that can be used to configure code generator 120. For example, configuration 170 may include information about constraints that should be satisfied for generated code 130 to operate correctly on target 150 and/or new target 190; information about optimizations that should be made with respect to generated code 130, etc.

Configuration 170 may be manual 172 or automatic 174 in an exemplary embodiment. For example, a manual configuration 172 may be implemented based on one or more user inputs (e.g., via keyboard inputs). In contrast, an automatic configuration 174 may be generated by a device, such as a host device running code generator 120. In one embodiment, configuration 170 may reside in database 160.

Constraint checker 180 may include logic that checks constraints 140 with respect to generated code 130. In one embodiment, constraint checker 180 may include a software application that checks an executable constraint document (e.g., constraints 140) that was generated when code was generated for target 150. Constraint checker 180 may be run against generated code 130 to verify that constraints are satisfied (e.g., to verify that assertions are true). Implementations of constraint checker 180 may be implemented in a variety of ways, such as via checklists, test scripts, compiler directives, etc.

An embodiment of constraint checker 180 may be run against generated code 130 to determine whether code generated for target 150 will operate in a determined manner when run on new target 190. For example, code generator 120 may have performed one or more optimizations when producing generated code 130, and constraints 140 may identify the optimizations, may document reasons why optimizations were performed, etc. Constraint checker 180 may be run against generated code 130 using constraints 140 (e.g., by executing constraints 140) when generated code 130 is going to be ported onto a device, such as new target 190. Constraint checker 180 may determine whether the optimizations are valid for new target 190 (e.g., by determining whether new target 190 will operate correctly using the optimizations present in generated code 130).

Constraint checker 180 may turn on or may turn off logic in generated code 130 and/or constraints 140 to facilitate verification of generated code 130 on new target 190. For example, constraint checker 180 may turn on debugging logic (code) in generated code 130 to allow input data that is out of range on target 190 to be flagged (e.g., an optimization may have been performed based on input signals compatible with target 150 and the optimization may need to be validated with respect to new target 190). Constraint checker 180 may further generate outputs that can be used by devices and/or user 195 to facilitate validation of generated code 130. For example, constraint checker 180 may produce information in a human-readable format, such as a checklist, that can be used by user 195 to validate generated code 130 with respect to new target 190.

New target 190 may include logic that runs generated code 130 to perform an operation. For example, new target 190 may represent a newer version of target 150, user 195 may include an individual that interacts with portions of system 105 and/or 100. For example, user 195 may interact with an output (e.g., a checklist, report, etc.) produced by constraint checker 180 to verify that constraints are satisfied when generated code 130 is ported to new target 190. User 195 may further input information into system 100 or 105, such as by entering information for specification 110, configuration 170, etc.

Exemplary Constraint Document

Figure 2:
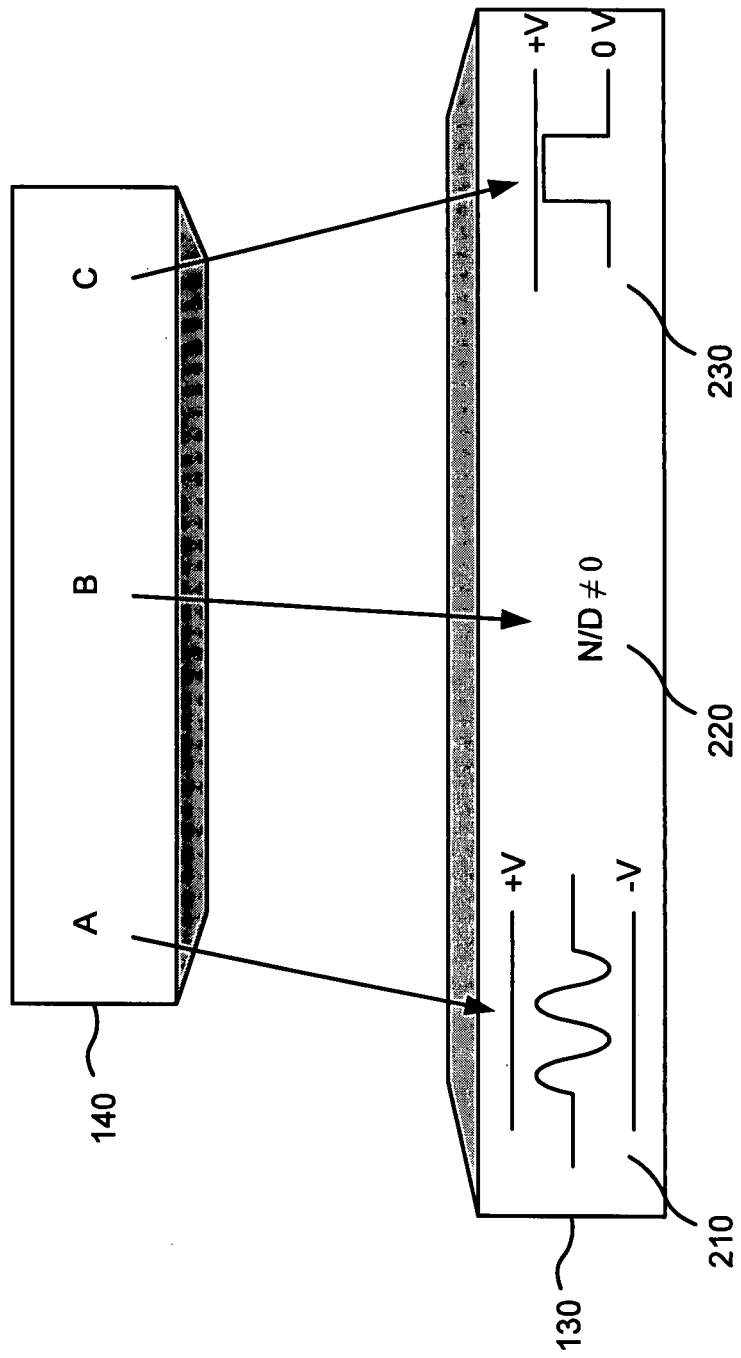
FIG. 2 illustrates an exemplary relationship between assumptions and generated code.

FIG. 2 illustrates an exemplary relationship between a constraint document (e.g., constraints 140) and generated code 130. FIG. 2 includes generated code 130 and constraints 140. Generated code 130 may include one or more constraints, such as assumptions or assertions. In one embodiment, these constraints may include constraints 210, 220, and 230. Constraint 210 may identify that an input signal should be within a determined range, such as between +V and −V, constraint 220 may identify that a division operation will never be zero, and constraint 230 may identify that an input signal will never be less than zero volts (e.g., an input pulse will always be between zero volts and +V). In one embodiment, constraints 210, 220, and 230 may represent assumptions that are satisfied when generated code 130 operates properly on target 150.

Code generator 120 may generate constraints 140 when producing generated code 130, where constraints 140 includes information that identifies constraints 210, 220, and 230. Exemplary embodiments of constraints 140 may allow assumptions to be captured while transformations occur in code generator 120. For example, constraints 140 may include information that identifies a particular assumption, information that identifies where the assumption occurs in generated code 130, information about why the assumption was made, information about optimizations that were made in generated code 130 based on an assumption, etc. For example, A may include executable information (e.g., code) about assumption 210, B may include executable information about assumption 220, and C may include executable information about assumption 230. A, B and C may be used by new target 190 when generated code 130 is ported thereto to validate assumptions 210, 220, and 230.

Exemplary embodiments of constraints 140 may identify substantially any type of information in generated code 130. For example, constraints 140 may include information about an argument of a function that is in generated code 130. In one embodiment, constraints 140 may include a formal argument that indicates one or more variables declared in an argument list for the function contained in generated code 130. In another embodiment, constraints 140 may indicate actual arguments for variables that can be declared outside the function while still being associated with the function (e.g., actual arguments that operate as inputs and/or outputs for the function).

Exemplary Code Generation Techniques

FIG. 3A illustrates an exemplary technique for generating code from a diagram. A block diagram 310 may include one or more graphical representations that identify operations performed within the diagram. For example, a source block may generate data and may make the data available to another block, such as a summation block. The summation block may add inputs to produce an output. A subsystem may include one or more elements that perform operations based on an input to produce an output. A feedback block may feed data from an output portion of a block or diagram to an input portion of a block or diagram. An output block may receive data and may archive the data (e.g., to a storage device) or may make the data available to another block or device (e.g., a scope block that displays information associated with the output block).

Information in diagram 310 may be represented using a diagram, such as a tree diagram 310A. Tree diagram 310A is illustrative of one technique that can be used to represent relationships between information in diagram 310 and other embodiments may use other relationships (e.g., an ordered list). Tree diagram 310A may represent blocks and/or connections associated with diagram 310. For example, tree diagram 310A may represent blocks as nodes (circles in FIG. 3A) and block diagram connections as branches of the tree. In one embodiment, tree diagram 310A may be processed using logic (e.g., code) to produce a result.

In one embodiment, diagram 310 may be part of specification 110 and may be operated on by code generator 120. For example, diagram 310 may be processed by code generator 120 via a first intermediate transformation 320 to produce a first intermediate result. For example, code generator 120 may combine certain blocks into a combination block. Code generator 120 may send information about first intermediate transformation 320 and/or a first intermediate result to constraints 140. For example, code generator 120 may send executable information about first intermediate transformation 320 to constraints 140. Code generator 120 may perform a second intermediate transformation 330 to produce a second intermediate result. Information about second intermediate transformation 330 and/or a second intermediate result may further be sent to constraints 140. Code generator 120 may produce generated code 130 based on the first and second intermediate transformations 320, 330.

In one embodiment, generated code 130 may be represented via tree diagram 130A. For example, tree diagram 130A may represent source code, such as C++ source code, that is generated from diagram 310. Tree diagram 130A may be similar to tree diagram 310A in certain implementations, or tree diagram 130A may differ significantly from tree diagram 310A in other implementations. When code generation is complete, constraints 140 may include executable information (e.g., traceability information 140A) that can be used to map generated code 130 (e.g., tree 130A) back to block diagram 310 (e.g., 310A). Alternatively, constraints 140 may include non-executable information, alone or in combination with executable information.

Information sent from code generator 120 to constraints 140 may be used by constraints 140 to record information about the operation of code generator 120. For example, constraints 140 may include information that allows a device, such as new target 190, to determine whether generated code 130 will operate correctly when installed thereon. In one embodiment, constraints 140 may include traceability information 140A that allows identification and validation of operations performed by code generator 120.

For example, traceability information 140A may include information that identifies first intermediate transformation 320, the first intermediate result, second intermediate transformation 330, the second intermediate result, and/or generated code 130. Traceability information 140A may further allow first intermediate transformation 320, the first intermediate result, second intermediate transformation 330, the second intermediate result, and/or generated code 130 to be validated (e.g., by allowing an optimization associated with second intermediate transformation 330 to be validated with respect to a device on which generated code 130 will run).

Embodiments that capture relationships using techniques, such as tree diagram 310A, may allow characteristics of generated code 130 to be captured and/or modified abstractly (e.g., without modifying generated code 130 itself). Information associated with these techniques may be inserted into generated code 130 to produce instrumented code (e.g., code that includes diagnostic information) and/or may remain separate from generated code 130 (e.g., may be in a document that is distinct with respect to generated code 130).

Figure 3B:
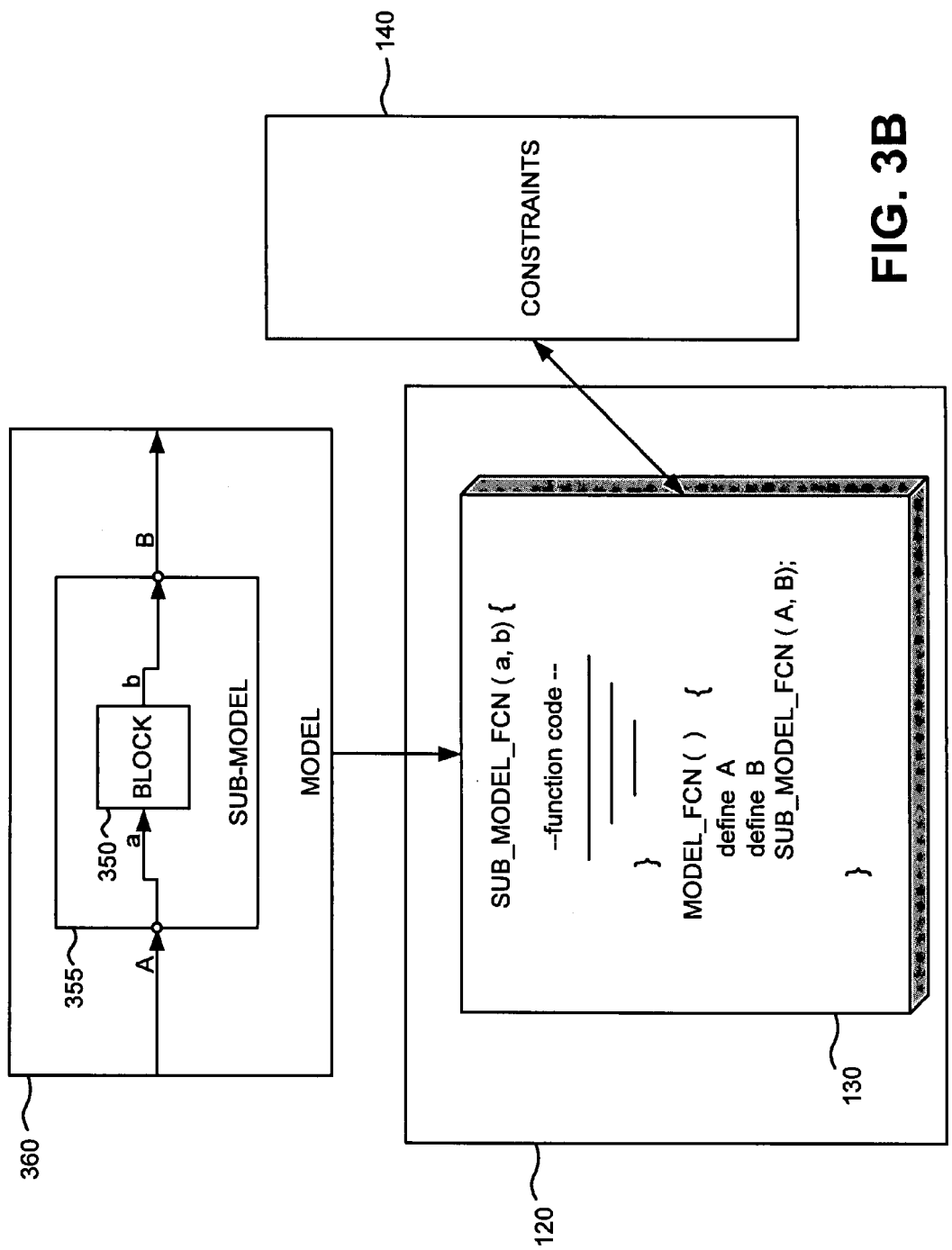
FIG. 3B illustrates an exemplary technique that can employ actual arguments and/or formal arguments of a function in generated code.

FIG. 3B illustrates an exemplary technique that can employ actual arguments and/or formal arguments of a function in generated code 130. For example, the embodiment of FIG. 3B may include code generator 120, generated code 130, constraints 140, block 350, sub-model 355, and model 360. Code generator 120, generated code 130, and constraints 140 may operate as previously described. Block 350 may include a graphical representation that can represent one or more execution methods (e.g., an algorithm, an update method, an input method, an output method, etc.). For example, block 350 may be a graphical icon associated with a time based, state based, event based, etc., block diagram. Block 350 may include an input signal, or value, such as "a" and may include an output signal, or value, such as "b." In one embodiment, input signals and output signals may connect block 350 with other blocks.

Sub-model 355 may include a graphical representation that includes block 350. For example, block 350 and other blocks may be grouped together as a sub-model, e.g., sub-model 355. Sub-model 355 may provide a technique for representing grouped elements (e.g., blocks) within a larger environment, such as a graphical model. In one embodiment, sub-model 355 may input a signal, or value, such as "a" into block 350 and get an output signal, or value, "b" from block 350. Input signals and output signals may connect blocks with other blocks, subsystems, sub-models, models, etc.

Model 360 may include a graphical representation that can include sub-models 355 and/or other information, such as subsystems. Embodiments of model 360 may include instructions that allow systems, such as dynamic systems, to be simulated. In one embodiment, model 360 may serve as a specification to code generator 120. For example, code generator 120 may receive specification 110 (e.g., model 360) and may produce generated code 130 from model 360.

Code generator 120 may produce constraints 140 when generating code, where constraints 140 includes executable information that allows portions of generated code 130 to be identified and/or validated. For example, model 360 may input a signal, or value, such as "A" into sub-model 355 and may get an output signal, or value, "B" from the sub-model 355. In this case, the value "A" which is input to sub-model 355 is interpreted by sub-model 355 as value "a" which sub-model 355 inputs to block 350. Also, the value "b" output from block 350 to sub-model 355 is interpreted as value "B" in model 360. In the above case, the values "a" and "b" are formal arguments (inputs/outputs) of sub-model 355 and values "A" and "B" are its actual arguments.

Code generator 120 may be configured to capture information about formal arguments of sub-model 355 in constraints 140 so that "a" and "b" can be identified when they are present in generated code 130. Code generator 120 may further identify actual arguments to sub-model 355 (e.g., "A" and "B"). Code generator 120 may include information about actual arguments in constraints 140 when producing generated code 130. For example, constraints 140 may be executed to determine whether formal arguments or actual arguments in model 360 behave in a determined manner.

For example; as shown in FIG. 3B, generated code 130 may include a function called "Sub_Model_Fcn" that can include one or more formal arguments (e.g. "a" and "b" in FIG. 3B, or, alternatively, arg 1 or arg 2, etc. (not shown in FIG. 3B)). The generated code 130 may also include a function called "Model_Fcn" that can define one or more variables (e.g. "A" and "B"). The function "Model_Fcn"" may include information associated with model 360, such as information about sub-model 355 and/or block 350. For example, the function "Model_Fcn" may include another function "Sub_Model_Fcn" related to sub-model 355. In this case, the call to the function "Sub_Model_Fcn" may pass the actual arguments, such as "A" and "B." Arguments (e.g., actual arguments and/or formal arguments) may be used to pass information into or out of portions of generated code 130 (such as the "Sub_Model_Fcn" function).

Still referring to FIG. 3B, constraints 140 may include information that allows functions, arguments, variables, etc., in generated code 130 to be identified and/or related back to model 360, sub-model 355, and/or block 350. Embodiments of constraints 140 may be used to map one domain (e.g., a generated code domain that includes the "Sub_Model_Fcn" function) to another domain (e.g., a specification domain that includes model 360) without requiring that a user insert special instructions into either domain.

Constraints 140 may include human-readable and/or machine-readable instructions that can be operated on by a user and/or a device (e.g., a new target device). Constraints 140 may further include other types of information that may be useful to a user and/or device. For example, constraints 140 may include code that can be used to test generated code 130 to determine whether functions in generated code 130 operate correctly. Alternatively, constraints 140 may include a checklist that is used by a user or by a device to, for example, determine that a desired level of code coverage is achieved by generated code 130. Code coverage, as used herein, may include statement coverage, condition coverage, decision/condition coverage, modified condition/decision coverage, etc. Embodiments of constraints 140 can further include other types of human-readable or machine-readable information.

Embodiments of constraints 140, such as shown in FIG. 3B, can include information that allows relationships among elements (e.g., functions, variables, etc.) in generated code 130 to be identified. For example, generated code 130 may include nested functions, hierarchies of functions, etc. In an embodiment, constraints 140 may include information that allows the nested functions to be identified and/or that allows relationships among these functions to be identified. For example, generated code 130 may include a reentrant function (e.g., a function that can be shared by a number of callers without having the calls interfere with each other) and/or a non-reentrant function. Constraints 140 may be created when code is generated and constraints 140 may contain information that allows the reentrant function and/or non-reentrant function to be identified in generated code 130. Constraints 140 may further include information that allows the functions to be related back to a specification from which the reentrant function and/or non-reentrant function were generated.

Embodiments of constraints 140 may contain information about processes, objects, other functions, etc., that can call the reentrant function and/or non-reentrant function and may include information about processes, objects, other functions, etc., that can receive information from the reentrant function and/or non-reentrant function. In one embodiment, a user may specify that code generator 120 create the reentrant function and/or non-reentrant function, and in another embodiment, code generator 120 may create the reentrant function and/or non-reentrant function without user intervention. Embodiments of constraints 140 may further include code that can be used to test the reentrant function and/or non-reentrant function (e.g., by executing constraints 140). In an embodiment, constraints 140 can test or validate the reentrant function or the non-reentrant function at runtime.

Exemplary Functional Diagram

Figure 4:
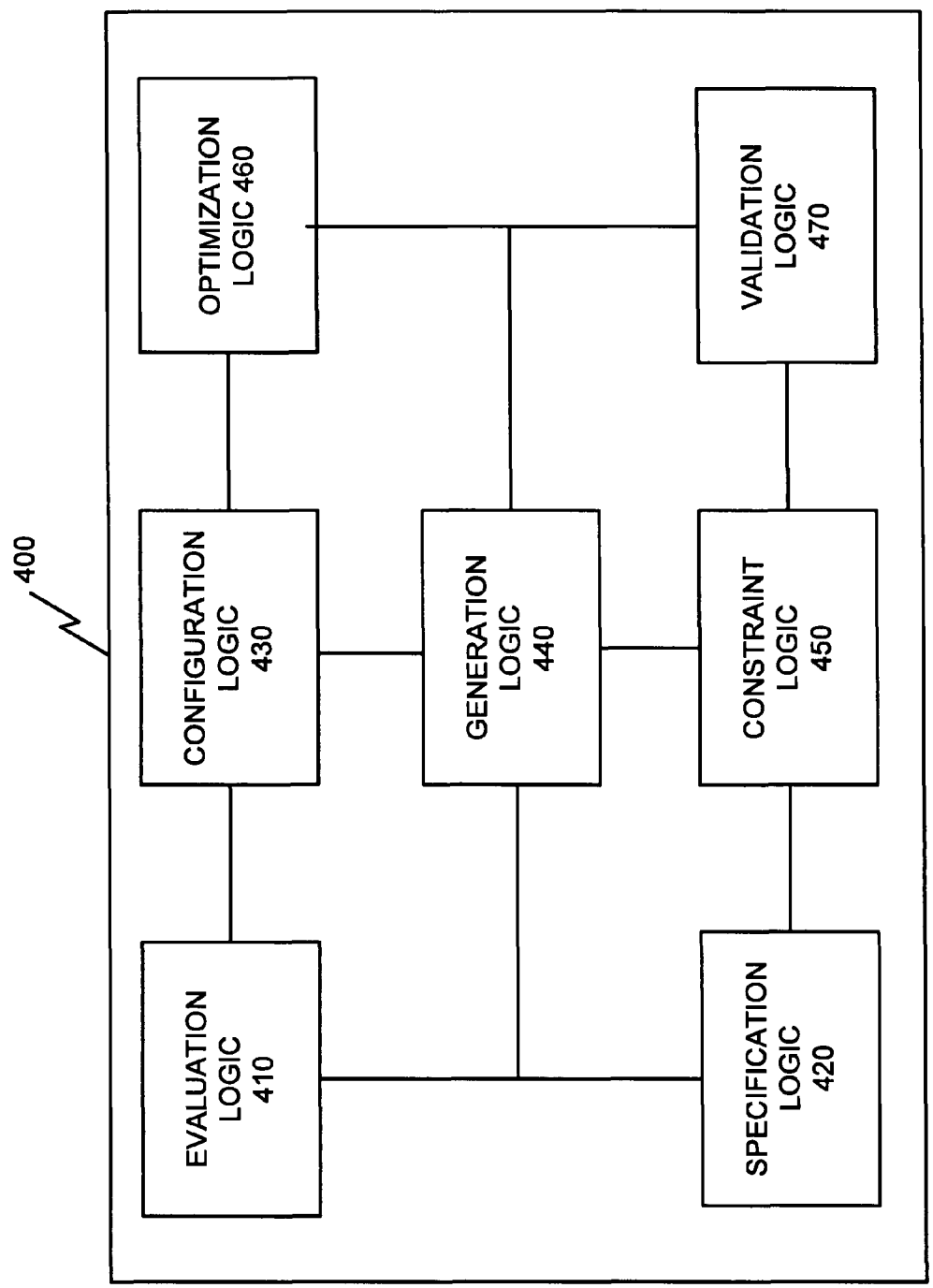
FIG. 4 illustrates an exemplary functional diagram showing logic that can be used to document generated code in an exemplary embodiment.

FIG. 4 illustrates an exemplary functional diagram 400 showing logic that can be used to document generated code in an exemplary embodiment. Components in FIG. 4 can reside on a single device, such as single computing device, or the components of FIG. 4 can be distributed across multiple devices, such as in a networked environment. Moreover, the components of FIG. 4 can be implemented in hardware based logic, software based logic, or a combination of hardware and software based logic (e.g., hybrid logic, wetware, etc.). The implementation of FIG. 4 is exemplary, and functional diagram 400 may include more components, fewer components, and/or components arranged differently from the arrangement of FIG. 4.

Functional diagram 400 may include evaluation logic 410, specification logic 420, configuration logic 430, generation logic 440, constraint logic 450, optimization logic 460, and validation logic 470. Evaluation logic 410 may include logic to process instructions or data related to user inputs, code generation, constraints 140, etc. Evaluation logic 410 may further process instructions related to other components in diagram 400, such as instructions that allow specification logic 420 to interact with generation logic 440.

Specification logic 420 may include logic to create or read specification 110. For example, specification logic 420 may generate, a block diagram in response to user inputs, and/or specification logic 420 may maintain information about blocks, connections, input data, output data, etc.

Configuration logic 430 may include logic to create or read configuration 170 in response to user inputs or instructions related to a device, such as a remote device. Configuration logic 430 may provide information to generation logic 440 for use in producing generated code 130.

Generation logic 440 may include logic that generates code based on information received from specification logic 420 (e.g., specification 110) and/or configuration logic 430 (e.g., configuration 170), a user, another device, etc. Generation logic 440 may create generated code 130 that can be used with a destination, such as target 150. In one embodiment, code generator 120 may generate information (e.g., constraints, assumptions, etc.) that can be used by generation logic 440 when code generator 120 generates code.

Constraint logic 450 may include logic that generates or reads constraints 140 when generation logic 440 is generating code. In one embodiment, constraints logic 450 may generate constraints 140 without requiring that modifications (e.g., special instructions) be included in specification 110. Constraint logic 450 may generate a file in which constraints 140 are stored, may insert constraints 140 into generated code 130 to produce instrumented code, may append constraints 140 to generated code 130, etc.

Constraint logic 450 may generate constraints 140 in a human-readable or a machine-readable format. For example, constraints logic 450 may generate a .txt file for use by an operator of system 100 and/or a machine-readable file (e.g., .exe, .mat, .c, .xml, etc.) for use by a machine. Constraints logic 450 may further generate interfaces to information in constraints 140. For example, an embodiment of constraints logic 450 may generate an API that allows information to be read from or written to constraints 140. Alternatively, the API may be used to convert information in constraints 140 from a first format to a second format (e.g., from a human-readable format to a machine-readable format, from a first machine-readable format to second machine-readable format, etc.)

Embodiments of constraint logic 450 may further include logic such as report generation logic, checklist generation logic, etc. For example, constraint logic 450 may generate a report according to a determined format (e.g., a reporting format dictated by government regulations), where the report includes information that can be used by a device or a person to verify the operation of generated code 130 on a device, such as new target 190.

Optimization logic 460 may include logic that performs optimizations when generation logic 440 is generating code. For example, optimization logic 460 may determine that an input signal will never approach a saturation threshold associated with target 150. Optimization logic 460 may disable or delete saturation detection logic in generated code 130 since the saturation detection logic is not needed.

Validation logic 470 may include logic that can be used to validate generated code 130 and/or other devices, components, objects, etc., in system 100 or 105. For example, validation logic 470 may operate with a report generated by constraint logic 450 to validate the operation of generated code 130 on new target 190. For example, generated code 130 may include an optimization and the report may include information that identifies why the optimization was made and where the optimization resides in the generated code. The report may further include the original code that was replaced by the optimization. Validation logic 470 may evaluate generated code 130, the report, and/or information about new target 190 (e.g., shift behavior, memory initialization protocols, data widths, etc.) to determine whether the optimization is valid for new target 190.

Validation logic 470 may report an error when the validation determines that generated code 130 will not operate in a determined manner (e.g., in a repeatable manner, in a manner that produces a desired result, etc.), may correct the error by removing the optimization and inserting non-optimized code, may install an emulator on new target 190, where the emulator allows new target 190 to operate like target 150, etc. Validation logic 470 may further generate a checklist that can be used by an operator or a device to validate generated code 130.

Illustrative Examples

Exemplary embodiments as described in connection with FIGS. 1A, 1B, 2, 3A, 3B, and 4 may be used to document and/or validate constraints in substantially any type of code generation process. For example, a graphical model may be generated using a sample rate of 1 millisecond (ms) and code generated from the model may be designed to run on target 150 at a 1 ms sample rate. An operator may retrieve generated code 130 from database 160 and may wish to run generated code 130 on new target 190. The operator may install generated code 130 on new target 190 and may try to run generated code 130 at a sample rate of 2 ms, where 2 ms is a sample rate that is incompatible with generated code 130. Constraints 140, when executed, may detect the incompatible sample rate and may provide a warning to the operator via a display device. For example, constraints 140 may include logic (e.g., code) that evaluates the original sample rate in generated code 130 and further evaluates the new sample rate on new target 190. Constraints 140 may further identify a code portion that specifies the 1 ms sample rate so that the operator can study the code portion. Constraints 140 may further identify optimizations that were made in the generated code based on the 1 ms sample rate.

In a second example, an operator may specify a minimum and maximum range for a signal, such as an input signal to a model. Code generator 120 may perform code generation and may take the specified min/max signal value into account during code generation by performing one or more optimizations. For example, code generator 120 may determine that target 150 can safely handle input signals in excess of the min/max values specified by the operator. Code generator 120 may remove input overload protections for input signals in order to optimize generated code 130 (e.g., to make generated code 130 run faster than the code would run if the overload protections remained in place).

The operator may attempt to run generated code 130 on new target 190. Constraint checker 180 may be used to determine whether generated code 130 will safely run on new target 190. Constraint checker 180 may determine that new target 190 has a min/max input range that is less than the min/max input range for target 150. For example, constraints 140 may include logic that checks an input signal and determines whether the signal exceeds an allowable range. Constraint checker 180 may execute constraints 140 and may run the input signal logic against generated code 130 and/or new target 190 to determine whether generated code 130 will work in a determined manner when run on new target 190. Constraint checker 180 may flag a portion of generated code 130 that operates on the input signal to indicate that the input signal exceeds the input range of new target 190. Constraint checker 180 may also provide replacement code that can be used to replace the code portion that will not operate properly on new target 190.

In a third example, code may be generated for a safety critical application that requires optimizations be mapped to requirements in the code in order for the code to be valid. An operator may generate code using code generator 120. Code generator 120 may produce generated code 130 and constraints 140. Generated code 130 may include optimizations and constraints 140 may include information that validates the optimizations. For example, constraints 140 may include information that identifies optimizations in the generated code, requirements that led to the optimizations and/or information about a device on which generated code 130 will be run. In one embodiment, the information in constraints 140 can be annotated to indicate why the optimizations are valid when run on new target 190, etc. The operator may execute constraints 140 to validate the optimizations.

In a fourth example, code generator 120 may generate code for a discrete integrator that runs at regular intervals (e.g., once every 1 ms). Since the integrator runs at regular intervals, code generator 120 may hard code the 1 ms timing interval into an equation for the integrator. Code generator 120 may produce generated code 130 that contains the hard coded timing interval. An operator may retrieve generated code 130 and may try to run generated code 130 on new target 190 using a timing of 2 ms. Constraint checker 180 may use constraints 140 to determine that a 2 ms interval is incompatible with generated code 130. Constraint checker 180 may provide a warning to a user indicating that generated code 130 is invalid for an interval of 2 ms. Constraint checker 180 may further provide the operator with information that identifies the hard coded portion of generated code 130 so that the operator can change the timing interval to an acceptable value. Alternatively, constraint checker 180 may automatically change generated code 130 to make generated code valid for a 2 ms interval.

In a fifth example, generated code 130 may include an optimization that determines whether target 150 has a hardware capability or an operating system capability to reset memory (e.g., to zero out a memory before generated code 130 is run on target 150). Generated code 130 may operate properly on target 150 since target 150 may include a hardware or operating system memory reset capability. Generated code 130 may be loaded onto new target 190, where new target 190 does not include a hardware or an operating system memory reset capability. Therefore, generated code 130 may not run correctly on new target 190. Constraints 140 may include information that detects the incompatibility and further identifies a portion of generated code 130 that will be impacted when memory is not reset. Constraints 140 may further include code that can be inserted into generated code 130 to reset a memory on new target 190 so that generated code 130 will operate in a determined manner. Alternatively, constraint checker 180 may operate with constraints 140 to detect and/or modify incompatibilities in generated code 130.

In a sixth example, constraints 140 may include code that performs multiple operations on new target 190, such as code that performs variable dimensioning, code that performs overflow and/or underflow detection/protection, code that performs memory initialization, etc. Constraints 140 may perform these operations statically and/or dynamically (e.g., at runtime).

The examples discussed hereinabove and elsewhere are illustrative. Other embodiments can be implemented in other ways and/or can operate in ways that differ from implementations and/or operations described herein without departing from the spirit of the invention.

Exemplary Data Structure

Figure 5:
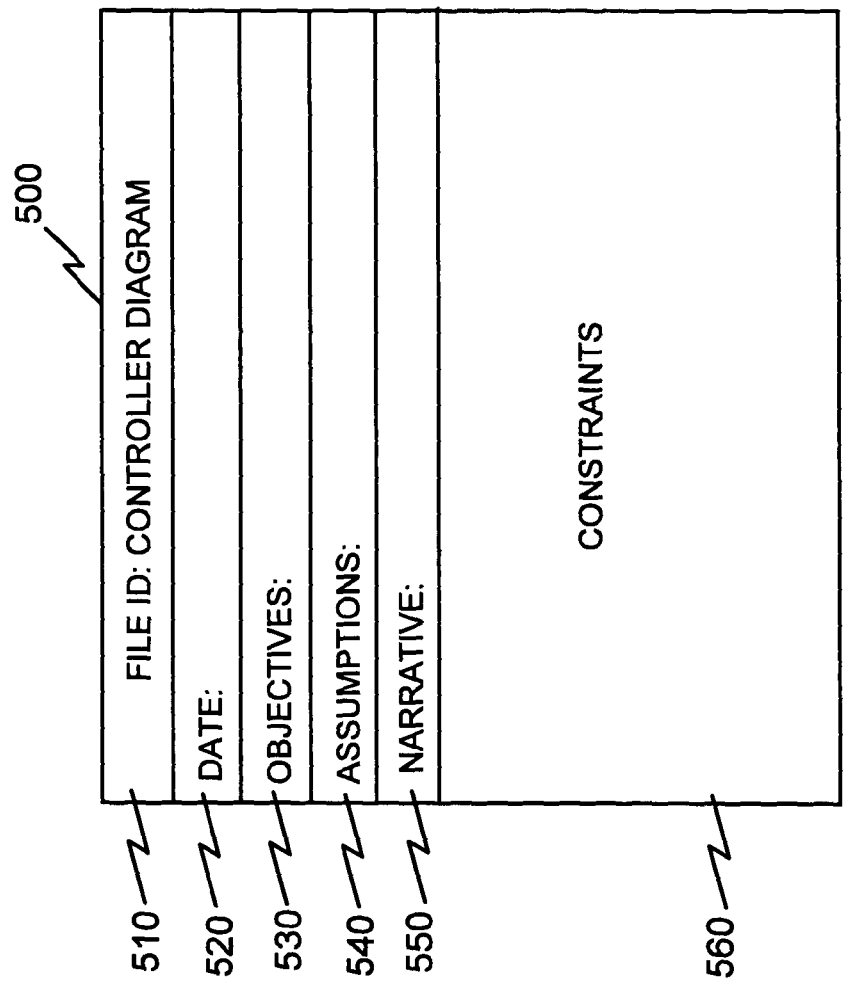
FIG. 5 illustrates an exemplary data structure for storing information associated with code generation in an exemplary embodiment.

FIG. 5 illustrates an exemplary data structure for storing information associated with code generation in an exemplary embodiment. Data structure 500 may be implemented via a computer-readable medium that is used to store information in a machine-readable format. Exemplary implementations may use substantially any number of data structures 500 to store information associated aspects of generating code (e.g., storing specification 110, generated code 130, constraints 140, configuration 170, etc.). Implementations of data structure 500 may be populated via an operator or a device, such as a computer operated by a user that interacts with specification 110, code generator 120, etc.

In one implementation, data structure 500 may include information arranged in a row and column format to facilitate interpretation by users involved in code generation or using generated code on a target device and/or by devices (e.g., code generator 120), logic (e.g., validation logic 470), etc. Other implementations of data structure 500 may be configured in other ways.

Data structure 500 may include file identifier (ID) 510, date 520, objectives 530, assumptions 540, narrative 550, and constraints 560. File ID 510 may include information that identifies a file in which information related to data structure 500 is stored. File ID 510 may include a file name, an address, a link, or other type of information that can be used to identify a file or a location (e.g., a memory location) in which a file is stored. Date 520 may include information that identifies a date and/or time associated with data structure 500. For example, date 520 may include a date on which data structure 500 was created, saved, modified, etc.

Objectives 530 may include information that identifies one or more objectives associated with data structure 500. For example, objectives 530 may identify a file, or may contain information in a field of data structure 500, that contains a list of objectives for specification 110 and/or for generated code 130. The objectives may represent user identified goals that generated code 130 should achieve when run on target 150 and/or new target 190. Generated code 130 may or may not meet objectives identified in objectives 530.

Assumptions 540 may include information that identifies assumptions related to specification 110, generated code 130, target 150 and/or new target 190. For example, specification 110 may be prepared based on assumptions about target 150. Assumptions 540 may include an identifier for a file that includes the assumptions, or assumptions 540 may include the assumptions themselves (e.g., a list of assumptions).

Narrative 550 may include information that can be entered by and/or interpreted by a user or a device. For example, narrative 550 may include information about data structure 500 and/or devices, code, etc., in system 100 or 105. For example, narrative 550 may include user comments about observations made while generating specification 110, configuring code generator 120, etc. Assume, for sake of example, that a user observed that code generator 120 had to be initialized using an undocumented sequence of instructions. The user may include notes, diagrams, video clips, etc., about the initialization sequence in narrative 550.

Constraints 560 may include information about constraints that are related to generated code 130; specification 110; devices, components, objects, etc., in system 100, 105, etc.; devices, components, objects, etc., in system 100 or 105; etc. In one embodiment, constraints 140 may be stored in constraints 560. In another embodiment, constraints 560 may include a link, pointer, file name, etc., that identifies a location where constraints 140 can be found.

Exemplary Application Program Interfaces

Figure 6A:
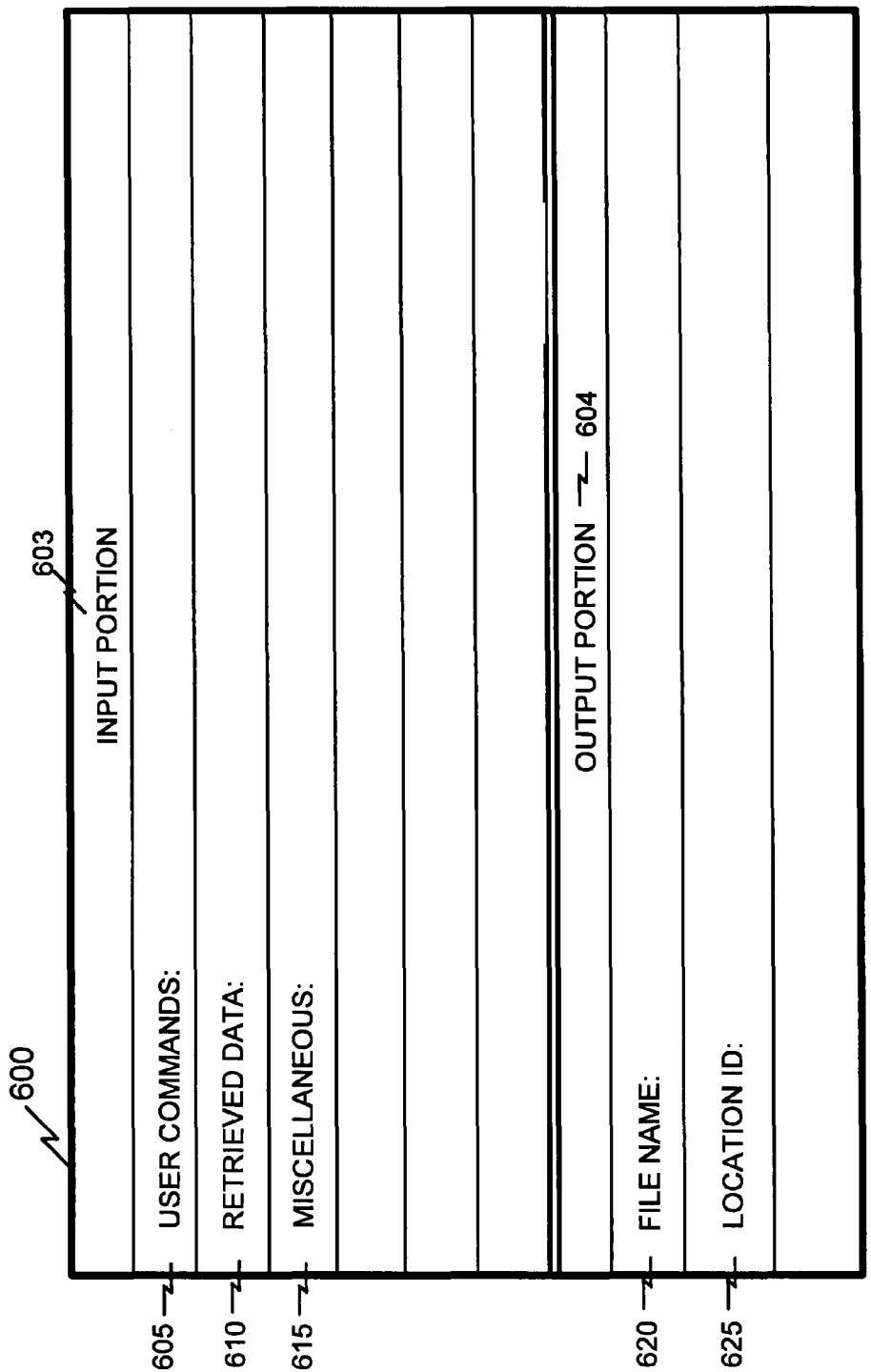
FIGS. 6A-C illustrate exemplary application program interfaces that can be used in exemplary embodiments.
Figure 6B:
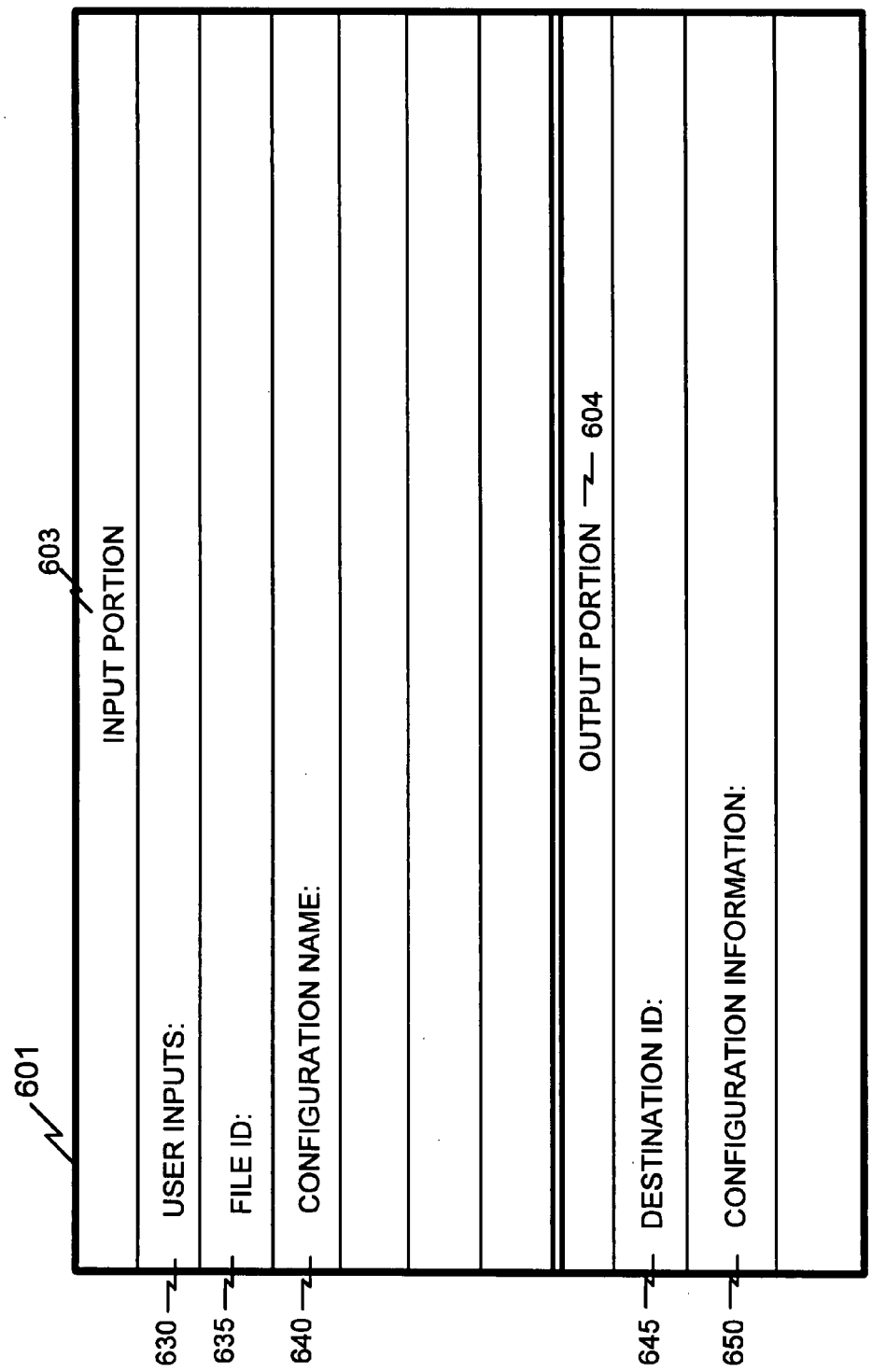
Figure 6C:
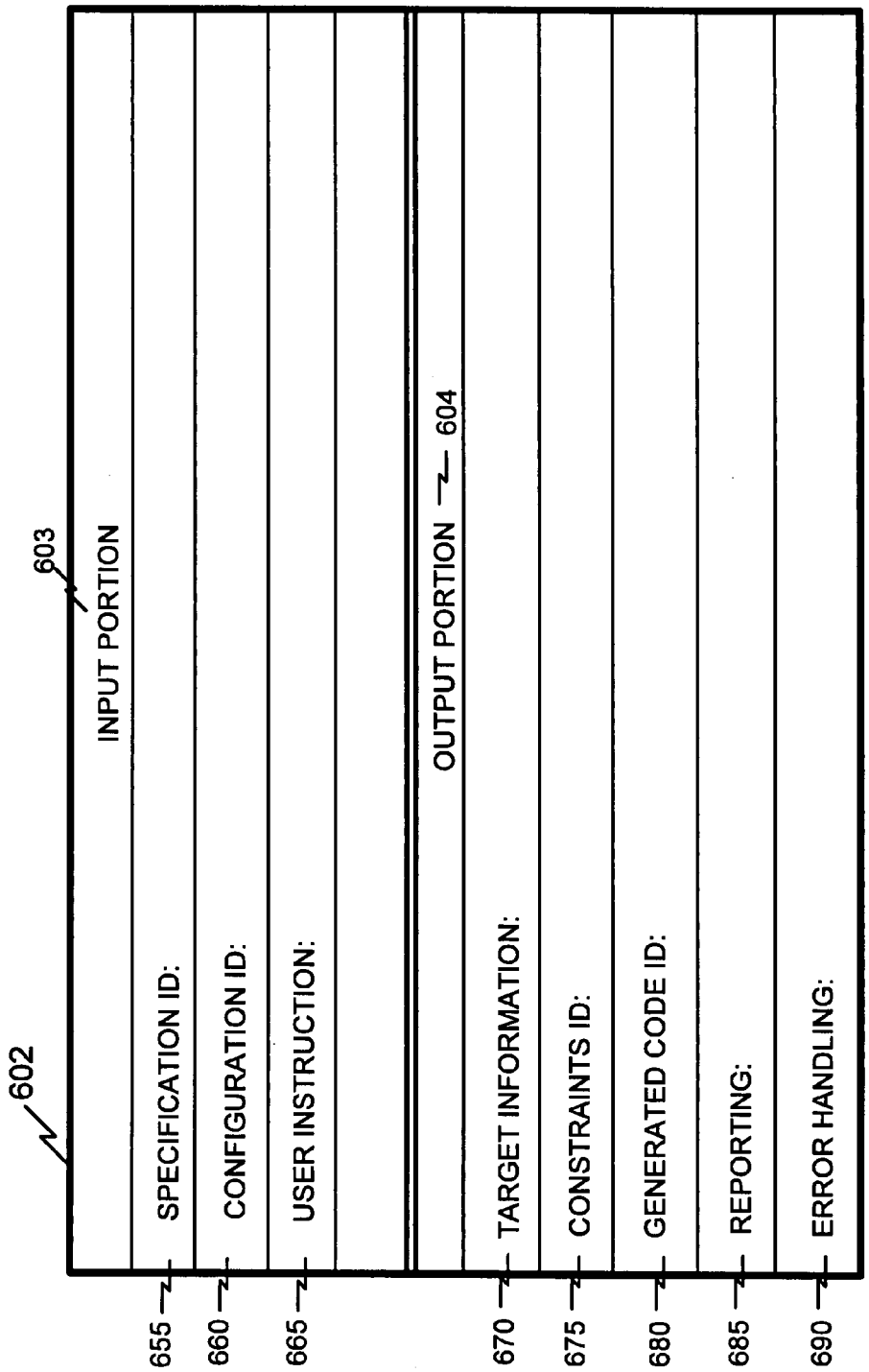

FIGS. 6A-C illustrate exemplary APIs that can be used in exemplary embodiments. These APIs may be code-based interfaces that can be used by systems, devices, objects, etc., to exchange information with another system, device, object, etc. For example, APIs may include data interfaces, function interfaces, execution interfaces (e.g., call sequence, call graphs, etc.), timing interfaces (e.g., task, sample time, etc.), etc. to allow information exchanges in systems 100 or 105. APIs may further provide mappings between generated code and higher level languages. Embodiments of APIs may be adapted for transmission from one device, component, object, etc., to another, e.g., by appending a header to an API to allow the API to be sent over a network to a destination.

FIG. 6A illustrates API 600 that can be used to create specification 110 in an exemplary embodiment. API 600 may include input portion 603 and output portion 604. Input portion 603 may include information and/or identifiers that can be used to make information available to specification 110 (e.g., data, instructions, identifiers, etc.). In one embodiment, input portion 603 may include user commands 605, retrieved data 610, and miscellaneous 615.

User commands 605 may include information received from a user. For example, a user may enter commands via an input device, such as a keyboard, mouse, trackball, microphone, touch sensitive display, biometric input device, etc. User commands may include instructions to create code, blocks, links (e.g., signal paths), data, etc. Retrieved data 610 may include information retrieved from a location, such as a storage location. For example, specification 110 may include a combination of user generated information and machine generated information, where the machine generated information is made available to specification 110 from a memory location. Miscellaneous 615 may include other types of information, such as parameter settings, comments, etc.

Output portion 604 may include information and/or identifiers that identify specification 110 and/or that identify a location associated with specification 110. File name 620 may include information that identifies a name for specification 110. Location ID 625 may include information that identifies a location where specification 110 can be stored. Location ID 625 may include a file name, an address, a link, etc.

FIG. 6B illustrates an exemplary API 601 that can be used with configuration 170 in an exemplary embodiment. In one implementation, API 601 may include an input portion 603 and an output portion 604. Input portion 603 may include user inputs 630, file ID 635, and configuration name 640.

User inputs 630 may include information received from a user. For example, a user may enter information about a configuration that should be used with code generator 120 to generate code for target 150. File ID 635 may include information that identifies a file that can contain information used to create configuration 170. Configuration name 640 may include information that identifies a particular implementation of configuration 170. For example, configuration ID 640 may include a file name, address, etc., for configuration 170.

Output portion 604 may include destination ID 645 and configuration 650. Destination ID 645 may include information that identifies a device, application, etc., that receives configuration 170. For example, destination ID 645 may include a name, address, etc., of code generator 120. Configuration information 650 may include data and instructions in configuration 170 that code generator 120 may need when generating code using specification 110. For example, configuration information 650 may include information in user inputs 630 and information retrieved from a file identified by file ID 635.

FIG. 6C illustrates an exemplary API 602 that can be used to interact with code generator 120 in an exemplary embodiment. API 602 may include an input portion 603 that can include specification ID 655, configuration ID 660, and user instruction 665. Specification ID 655 may include information that identifies a specification 110 that can be sent to code generator 120. Configuration ID 660 may identify a configuration 170 that is used with code generator 120. User instruction 665 may include information input by a user for use with code generator 120. For example, user instruction 665 may include an instruction to start code generation.

Output portion 604 may include target information 670, constraints ID 675, generated code ID 680, reporting 685, and error handling 690. Target information 670 may include information that identifies a target device on which generated code 130 is configured to run. Constraints ID 675 may include information that identifies constraints 140, where constraints 140 is related to generated code 130. Constraints ID 675 may include an identifier for a file that includes constraints 140 (e.g., a file name, address, pointer, link, etc.), the actual contents of constraints 140, etc.

Generated code ID 680 may include information that identifies generated code 130. Embodiments of generated code ID 680 may include an identifier for a file that includes generated code 130 or may include generated code 130 itself. Reporting 685 may include information related to target information 670, constraints ID 675, generated code ID 680, the operation of code generator 120, etc. For example, reporting 685 can include status information that is displayed to a user, sent to a device, written to a file, etc., where the status information identifies whether code generator 120 operated in a determined manner when producing generating code 130. Error handling 690 may include information that identifies an error associated with code generator 120, such as an error produced when code generator 120 improperly produces generated code 130 or constraints 140.

Figure 7A:
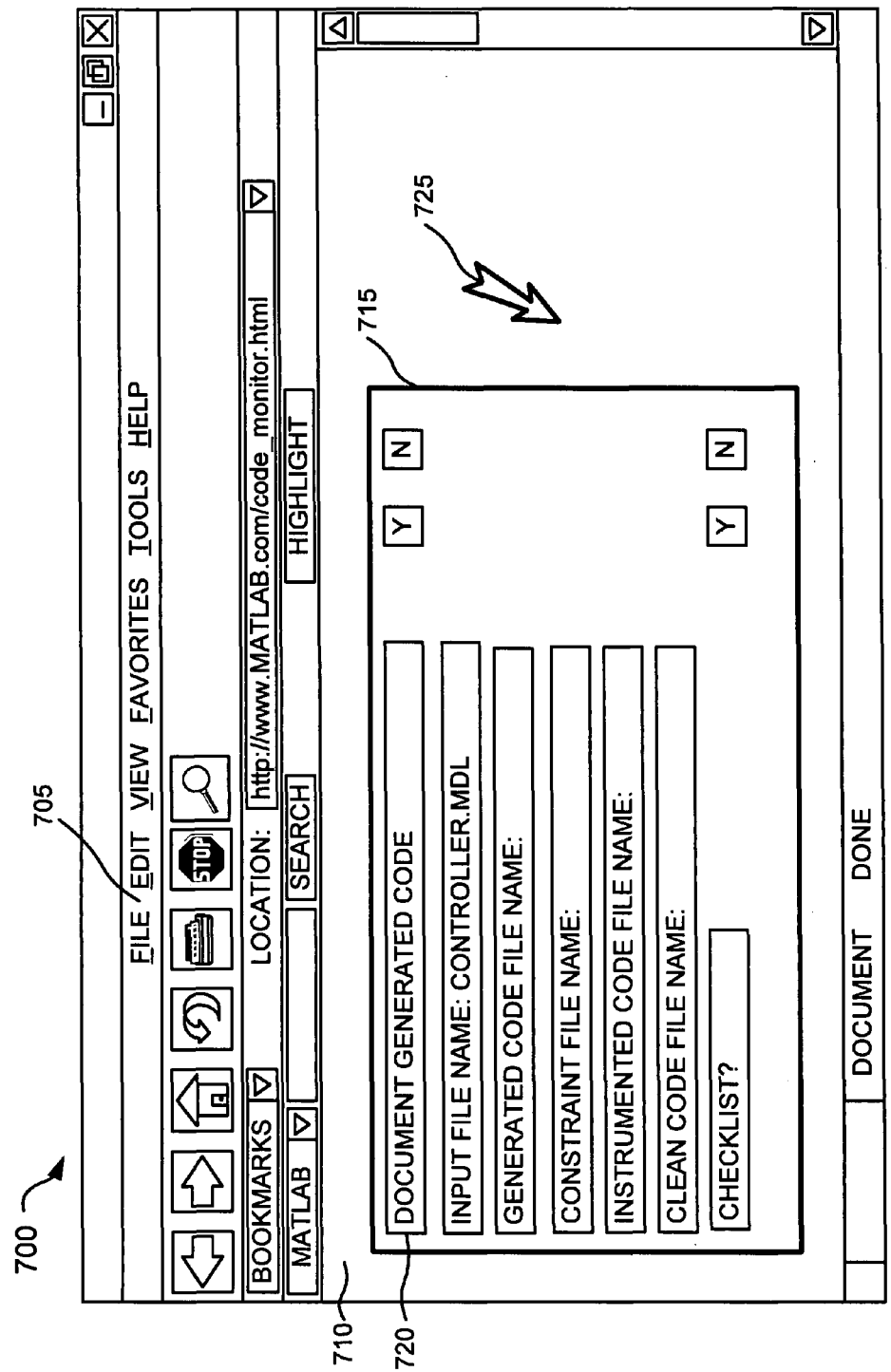
FIG. 7A illustrates an exemplary user interface that can be used to configure an exemplary embodiment.

APIs 600, 601 and 602 are exemplary and alternative embodiments of system 100 or 105 may include more APIs, fewer APIs, or APIs in configurations that differ from those of FIGS. 6A-6C. In addition, APIs 600, 601 and 602 used with exemplary embodiments may include more fields, fewer fields, or fields arranged in orders that differ from the ordering of fields in FIGS. 6A-6C. APIs 600, 601 and 602 may operate as unified APIs Exemplary User Interfaces FIG. 7A illustrates an exemplary user interface that can be used to configure an exemplary embodiment. Interface 700 and/or other interfaces described herein may be a graphical user interface (GUI) or a non-graphical user interface, such as a text based interface. User interface 700 and/or other user interfaces described herein may further provide information to users via customized interfaces (e.g., proprietary interfaces) and/or interfaces that are generally known to those of skill in the art (e.g., browser-based interfaces).

User interfaces described herein, may receive user inputs via input devices, such as but not limited to, keyboards, pointing devices (e.g., a mouse, stylus, trackball, touchpad, joystick, other types of motion tracking devices, etc.), biometric input devices, touch sensitive displays, microphones, etc. User interfaces described herein may be user configurable (e.g., a user may change the size of the user interface, information displayed in a user interface, color schemes used by the user interface, positions of text, images, icons, windows, etc., in the user interface, etc.) and/or may not be user configurable.

Interface 700 may be displayed to a user via an output device and may include menu 705, display area 710, information window 715, fields 720, and cursor 725. Menu 705 may include information associated with menus that are accessed by the user. For example, in one embodiment, menu 705 my identify items, such as File, Edit, View, etc., that can be selected by a user (e.g., via cursor 725) to open one or more drop down menus. Drop down menus may provide the user with substantially any number of items that can be selected by the user to invoke various types of functionality on the user's behalf. For example, selecting File may open a drop down menu that includes Open, Close, Save, Save As, Print, Print Preview, etc. Interface 700 may further include icons that let the user perform actions, such as moving to a previous display, returning to a home display (or page), printing the contents of a portion of interface 700, etc.

Display area 710 may include a portion of interface 700. For example, display area 710 may include a portion of interface 700 that is located below menu 705. Display area 710 may, or may not, be defined by a border (e.g., a boundary). Information window 715 may occupy a portion of display area 710 that is used to display information to a user, such as information related to specification 110, code generator 120, generated code 130, constraints 140, etc.

Fields 720 may include information related to generating code. For example, fields 720 may display information that allows a user to select whether generated code should be documented. For example, an executable file, such as constraints 140, may be generated when a user indicates that generated code should be documented. In contrast, constraints 140 may not be generated when the user indicates that generated code should not be documented. Fields 720 may further include information about an input file name, such as a name for an input file to code generator 120. Fields 720 may also include a file name for generated code, a name for a constraint file, a name for generated code that includes constraint information embedded in the code (instrumented code), a file name for un-instrumented generated code, and a name for a checklist or a report. For example, code generator 120 can generate a checklist based on a user input.

Cursor 725 may include a mechanism that can be positioned by a user or device to identify information in interface 700. Cursor 725 may be positioned within interface 700 via a pointing device, a spoken command, a keyboard input, etc.

Figure 7B:
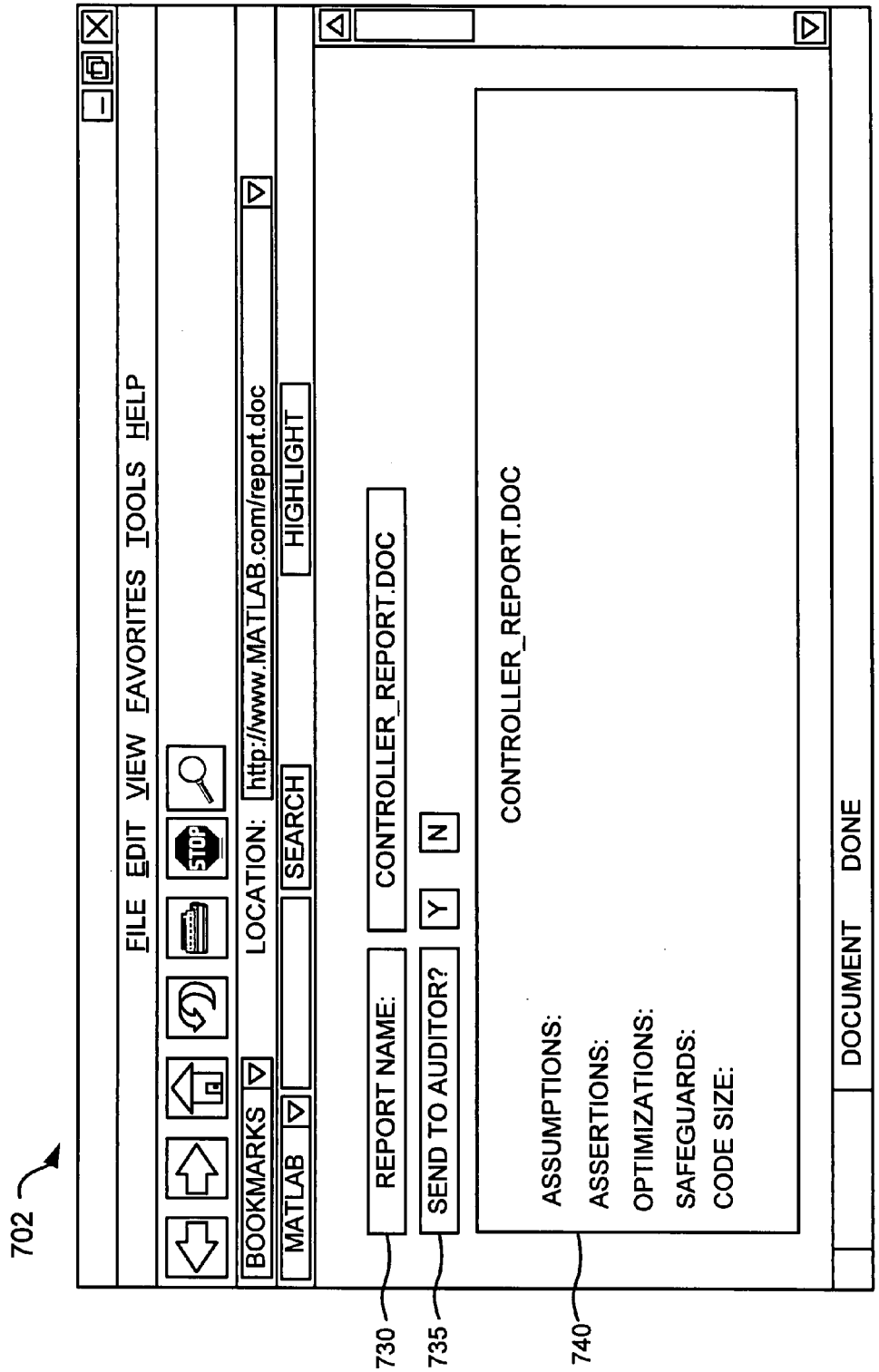
FIG. 7B illustrates an exemplary user interface that can be used to display information about generated code in an exemplary embodiment.

FIG. 7B illustrates an exemplary user interface 702 that can be used to display information about generated code in an exemplary embodiment. Interface 702 may be similar to interface 700 and may include report name 730, send button 735, and report window 740. Report name 730 may include information that identifies a report that includes information about generated code 130. In one embodiment, the report may be constraints 140 and in another embodiment the report may be a document that includes information about generated code 130, constraints 140, specification 110 and/or configuration 170. Embodiments of the report may be in human-readable or machine-readable forms.

Send button 735 may allow a user to send information to a destination, such as a destination associated with an auditor. For example, code generator 120 may generate code for an application that needs to meet government certification, such as a safety critical certification. Code generator 120 may generate an executable document, e.g., constraints 140, and a separate, non-executable, report that details generated code 130 (e.g., the report may identify optimizations that were made, may include validation information about the optimizations, etc.). Selecting "Y" for send button 735 may send the report to the government auditor.

Report window 740 may include information in a report identified in report name 730. For example, report window 740 may include information about assumptions made with respect to generated code 130, assertions in generated code 130, optimizations in generated code 130, safeguards that may have been turned off or turned on in generated code 130, size information about generated code 130, etc. In one embodiment, the report can also include a listing of generated code 130, e.g., a source code listing.

FIG. 7C illustrates an exemplary user interface that can display a report 740 related to generated code. Report 740 may be displayed to a user via a display device, printed to hardcopy, or stored in a computer-readable medium. In one embodiment, report 740 may include information in constraints 140, and in another embodiment, report 740 may be produced along with constraints 140. Report 740 may include information about assumptions made in generated code 130, optimizations made in generated code 130, safeguards that may have been turned on or turned off when producing generated code 130, information about additional reports, etc. Other embodiments of report 740 may include other types of information. For example, an alternative embodiment of report 740 may include a checklist that can be completed by a user and/or a device.

Exemplary Processing

Figure 8A:
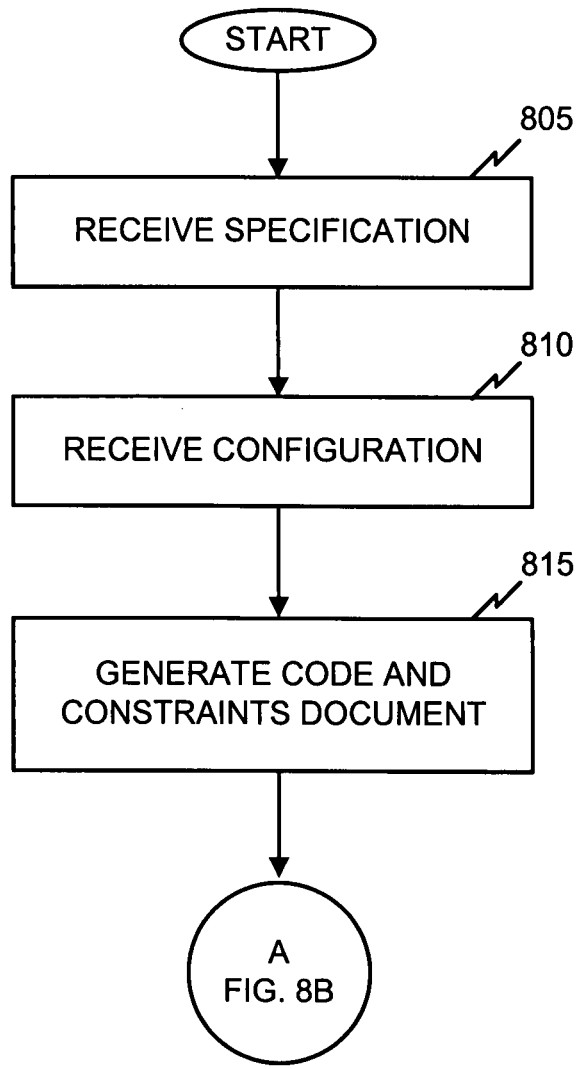
FIGS. 8A and 8B illustrate a flow chart showing exemplary processing that can be used with an exemplary embodiment.
Figure 8B:
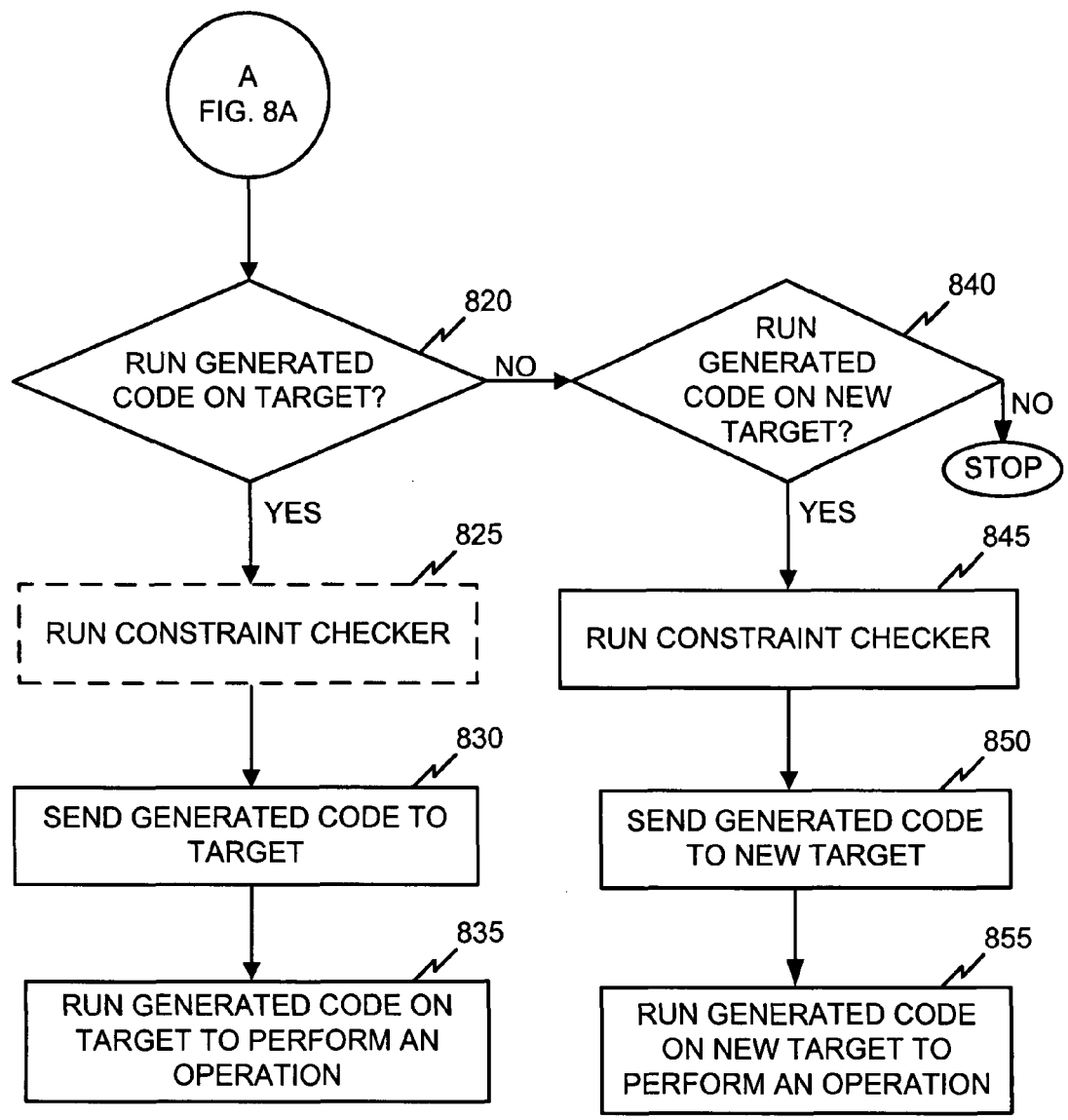

FIGS. 8A and 8B illustrate a flow chart showing exemplary processing that can be used with an exemplary embodiment. The acts discussed in connection with FIGS. 8A and 8B are illustrative. Other implementations may include more acts, fewer acts, or acts illustrated in FIGS. 8A and 8B in an order that differs from the ordering shown in FIGS. 8A and 8B.

A user may generate specification 110 using, for example, a graphical modeling application. In one embodiment, the graphical model may be generated in response to objectives (e.g., design objectives) and/or assumptions (e.g., assumptions about a device on which code generated from the model will be run). In one embodiment, assumptions may be user defined or tool defined (e.g., tooling assumptions). An environment running the graphical model may transform the objectives and/or assumptions into assertions.

A computing device may host code generator 120 and/or other applications (e.g., the graphical modeling application). The computing device may receive specification 110 (act 805). The computing device may further receive configuration 170 (act 810). For example, a user or a device may generate a configuration file that will be used when code is generated based on specification 110. The configuration file may include information that is used to configure hardware and/or software used during code generation. For example, the configuration file may include information about initializing a memory, about integer widths, overflow handling, etc.

The computing device may generate code and a constraints document based on specification 110 and configuration 170 (act 815). For example, code generator 120 may produce generated code 130 and constraints 140. Generated code 130 may be produced in substantially any format. For example, code generator 120 may produce source code, such as C source code (e.g., .h files, include files, etc.), C++ source code, make files, Perl code, Java code, etc. In an alternative embodiment, code generator 120 may produce compiled code, such as code in .dll files, .ASM files, etc. In one embodiment, code generator 120 may generate code that can work with another type of code. For example, code generator 120 may generate C source code that uses an integer representation of 16 bits. The generated C code may be operated on by Perl code that changes the 16 bit integer representation to a 32 bit integer representation, where the 32 bit representation is compatible with target 150.

Code generator 120 may automatically generate constraints 140 to capture assumptions in a form that can be validated against requirements and/or objectives. For example, information in constraints 140 may identify an existing hardware environment, software environment, etc., and may further include information that allows the hardware/software environment to be reestablished at a later time without requiring that code generator 120 regenerate code. Information in constraints 140 may act as diagnostic code that allows constraints imposed by generated code 130 to be validated when constraints 140 is executed. For example, constraints 140 can include code that identifies optimizations made by code generator 120 during code generation.

Constraints 140 may link assertions to features and/or optimizations in generated code. Constraints 140 may further link assertions, features and/or optimizations with requirements and/or objectives, which allows assertions, features, and/or optimizations to be traced back to the requirements and/or objectives. As a result, generated code 130 can be validated using exemplary embodiments described herein. For example, code generator 120 may generate intermediate representations when generating code. Code generator 120 may further perform optimizations based on requirements, information in configuration 170, etc. Constraints 140 may capture information (e.g., constraints) at each intermediate representation and/or whenever an optimization is performed. Information in constraints 140 may allow a user and/or device to determine where intermediate transformations occurred in generated code 130, where and/or why optimizations were performed, etc. Information in constraints 140 may allow accurate identification of a non-adhering constraint, as might occur when a constraint is not adhered to in generated code 130.

Constraints 140 may also include information about code coverage. For example, constraints 140 may include information generated from an analysis performed on generated code 130, where the analysis determines whether portions of generated code 130 are exercised when generated code 130 is run. Constraints 140 may also include other types of information, such as information used for a checklist or a report. For example, constraints 140 can generate a checklist that can be printed and/or used by an operator to determine whether generated code 130 meets determined criteria when run on target 150 or new target 190. A report may be generated according to a determined format, such as a government mandated reporting format. Constraints 140 may populate the report with information, or a user can manually enter information into the report. In one embodiment, constraints 140 may send the report to a destination.

Embodiments of code generator 120 can create instrumented code (e.g., code that includes executable information from constraints 140 within generated code 130) or un-instrumented code (e.g., by producing generated code 130 and a separate executable constraints 140 document, file, object, etc.). Code generator 120 may further produce an emulator that can be used to run un-instrumented code or instrumented code on new target 190 and/or another device.

Referring now to FIG. 8B, a determination may be made as to whether generated code 130 should be run on target 150 (act 820). Constraint checker 180 may optionally be run (block 825) when generated code will be run on target 150. For example, in one embodiment it may be desirable to run constraint checker 180 to analyze generated code 130 to determine that generated code 130 will operate in a determined manner on target 150 (e.g., by achieving a desired code coverage goal). Constraint checker 180 may also be run to perform other functions, such as to explicitly state constraints (e.g., to state constraints in a report). In another embodiment, a determination may be made that constraint checker 180 should not be run since generated code 130 was designed to run on target 150, and, therefore, constraint checking 165 may be unnecessary.

Generated code 130 may be sent to target 150 (act 830). For example, generated code 130 may be sent over a link (wired or wireless) to target 150. Target 150 may run generated code 130 to perform one or more determined operations, such as useful and/or tangible operations (act 835). For example, generated code 130 may be used to control a device (e.g., a robotic arm), to display information to a user, to store information in a storage device, to perform computations that generate a result, etc.

Returning to act 820, a determination may be made that generated code 130 should not be run on target 150. When this determination is made at act 820, processing may move to act 840. For example, a determination may be made as to whether generated code 130 should be run on new target 190 (act 840). Constraint checker 180 may be run on generated code 130 before generated code 130 is run on new target 190 (act 845). Constraint checker 180 may determine whether optimizations are valid on new target 190, whether assertions are valid on new target 190, whether desired code coverage is achieved when generated code 130 is run on new target 190, etc.

For example, constraint checker 180 may execute constraints 140 to determine that certain data (such as input data) is out of bounds when generated code 130 is run on new target 190 because new target 190 may have an input saturation that is lower than an input saturation for target 150. Constraint checker 180 may flag the data as being out of bounds and may identify a portion of generated code 130 that operates on the input data. Constraint checker 180 may further identify whether optimizations were made with respect to code that pertains to the input data. For example, constraint checker 180 may produce a message that explains the type of optimization that was made, identifies assumptions related to the optimization, provides non-optimized code that can be used to replace the optimized code, etc. In one embodiment, constraint checker 180 may complete a checklist on behalf of an operator to let the operator know whether generated code 130 will operate in a determined manner on new target 190. In another embodiment, constraint checker 180 may map optimizations, assumptions, etc., back to a source document (e.g., specification 110) using executable information in constraints 140.

Generated code 130 may be sent to new target 190 when constraint checker 180 determines that generated code 130 will operate in a determined manner (act 850). In one embodiment, act 850 may occur before act 845 and constraint checker 180 may be run on new target 190 when generated code 130 is received thereon.

Generated code 130 may be run on new target 190 to perform an operation (act 855). For example, target 150 may be a defibrillator that was built in 2005 and generated code 130 may run the defibrillator in a determined manner when installed thereon. Generated code 130 may be installed onto new target 190 in act 850, which may be a newer model of the defibrillator (e.g., a model built in 2006). Generated code 130, once validated, may perform the same operations on new target 190 (in act 855) that correspond to operations performed on target 150 when generated code 130 was previously run thereon.

Exemplary Device Architecture

Figure 9:
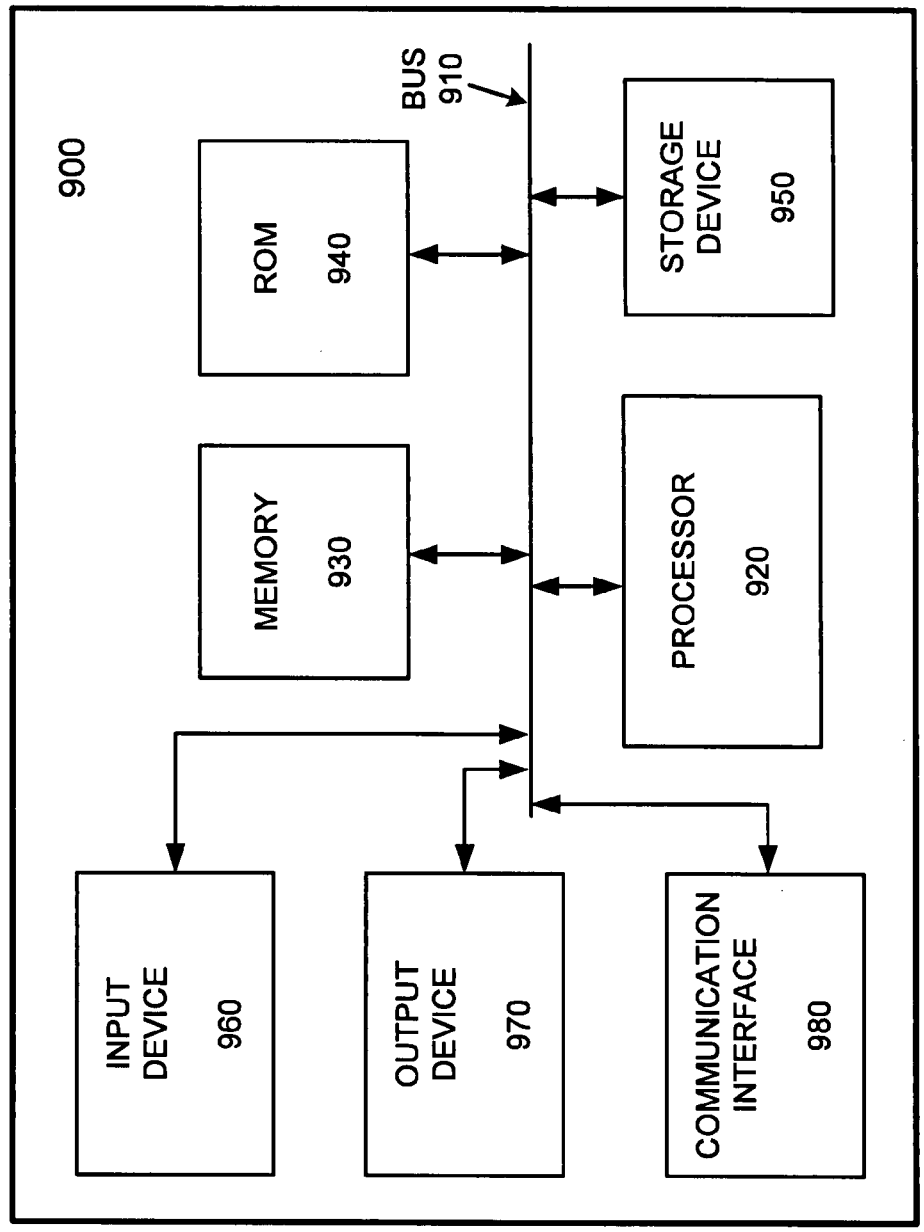
FIG. 9 illustrates an exemplary architecture for implementing an exemplary embodiment.

FIG. 9 illustrates an exemplary architecture for implementing exemplary embodiments on a computing device. As illustrated in FIG. 9, computer 900 may include a bus 910, a processor 920, a memory 930, a read only memory (ROM) 940, a storage device 950, an input device 960, an output device 970, and a communication interface 980.

Bus 910 may include one or more interconnects that permit communication among the components of computer 900. Processor 920 may include any type of processor, microprocessor, or processing logic that may interpret and execute instructions (e.g., an FPGA). Processor 920 may include a single device (e.g., a single core) and/or a group of devices (e.g., multi-core). Memory 930 may include a random access memory (RAM) or another type of dynamic storage device that may store information and instructions for execution by processor 920. Memory 930 may also be used to store temporary variables or other intermediate information during execution of instructions by processor 920.

ROM 940 may include a ROM device and/or another type of static storage device that may store static information and instructions for processor 920. Storage device 950 may include a magnetic disk and/or optical disk and its corresponding drive for storing information and/or instructions.

Input device 960 may include any mechanism or combination of mechanisms that permit an operator to input information to computer 900, such as a keyboard, a mouse, a touch sensitive display device, a microphone, a pen-based pointing device, and/or a biometric input device, such as a voice recognition device and/or a finger print scanning device. Output device 970 may include any mechanism or combination of mechanisms that outputs information to the operator, including a display, a printer, a speaker, etc.

Communication interface 980 may include any transceiver-like mechanism that enables computer 900 to communicate with other devices and/or systems, such as target 150, new target 190, etc. For example, communication interface 980 may include one or more interfaces, such as a first interface coupled to a network and/or a second interface coupled to another device, such as a network device (e.g., router, firewall, switch, gateway, etc.). Alternatively, communication interface 980 may include other mechanisms (e.g., a wireless interface) for communicating via a network, such as a wireless network. In one implementation, communication interface 980 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 900 may perform certain functions in response to processor 920 executing software instructions contained in a computer-readable medium, such as memory 930. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Networked Embodiment

Figure 10:
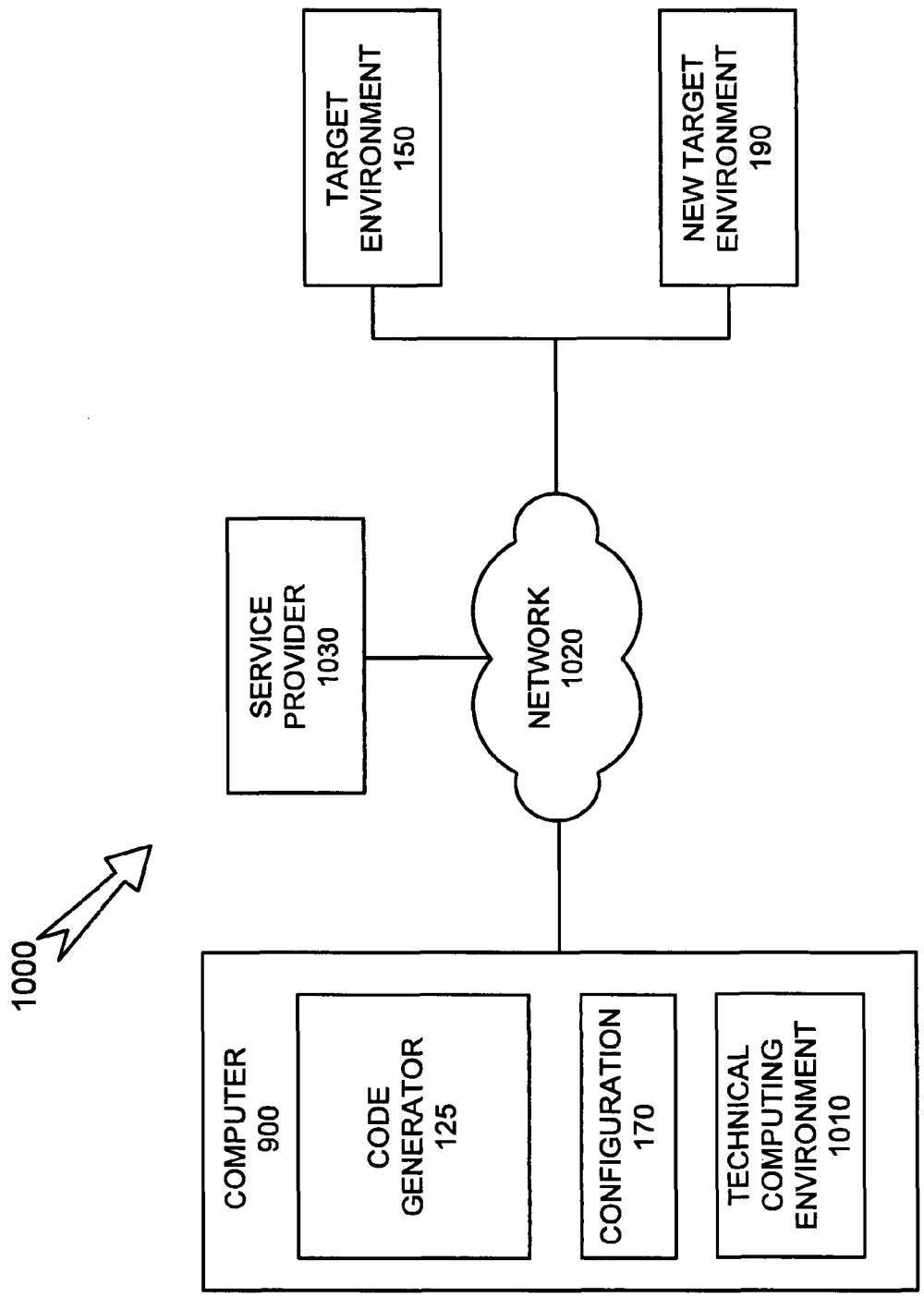
FIG. 10 illustrates an exemplary networked embodiment that can be used to generate code.

FIG. 10 illustrates an exemplary system 1000 that can be used to generate code in a networked environment. System 1000 may include target 150, new target 190, computer 900, network 1020, and service provider 1030. The embodiment of FIG. 10 is illustrative and other embodiments can include additional devices, fewer devices, or devices in arrangements that differ from the arrangement of FIG. 10.

Computer 900 may include a device capable of sending data to or receiving data from another device, such as target device 150. "Data," as used herein, may refer to any type of machine-readable information having substantially any format that may be adapted for use in one or more networks and/or with one or more devices. Data may include digital information or analog information. Data may further be packetized and/or non-packetized.

Computer 900 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

In one embodiment, computer 900 may include code generator 120, configuration 170, and technical computing environment (TCE) 1010. In other embodiments, computer 900 may include other components, applications, etc. (e.g., peripheral devices, etc.).

TCE 1010 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language such as C++, C, Fortran, Pascal, etc.

In one implementation, TCE 1010 may include a dynamically typed language that can be used to express problems and/or solutions in mathematical notations familiar to those of skill in the relevant arts. For example, TCE 1010 may use an array as a basic element, where the array may not require dimensioning. In addition, TCE 1010 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and design, state based analysis and design, etc.

TCE 1010 may further provide mathematical functions and/or graphical tools (e.g., for creating plots, surfaces, images, volumetric representations, etc.). In one implementation, TCE 1010 may provide these functions and/or tools using toolboxes (e.g., toolboxes for signal processing, image processing, data plotting, distributed processing, etc.). In another implementation, TCE 1010 may provide these functions as block sets. In still another implementation, TCE 1010 may provide these functions in another way, such as via a library, etc. TCE 1010 may be implemented as a text based environment, a graphically based environment, or another type of environment, such as a hybrid environment that is both text and graphically based.

Network 1020 may include any network capable of transferring data (e.g., packet data or non-packet data). Implementations of network 1020 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, etc.

Network 1020 may include network devices, such as routers, switches, firewalls, and/or servers (not shown). Network 1020 may be a hardwired network using wired conductors and/or optical fibers and/or may be a wireless network using free-space optical, radio frequency (RF), and/or acoustic transmission paths. In one implementation, network 1020 may be a substantially open public network, such as the Internet. In another implementation, network 1020 may be a more restricted network, such as a corporate virtual network. Implementations of networks and/or devices operating on networks described herein are not limited to any particular data type, protocol, architecture/configuration, etc.

Service provider 1030 may include logic that makes a service available to another device on network 1020. For example, a service provider 1030 may include a server operated by an entity (e.g., an individual, a corporation, an educational institution, a government agency, etc.) that provides one or more services to a destination, such as computer 900. Services may include instructions that are executed by a destination to allow the destination to perform an operation, or instructions that may be executed on behalf of the destination or to perform an operation on the destination's behalf.

Assume, for sake of example, that a corporation operates a web server that provides one or more web-based services to a destination. The web-based services may allow the destination (e.g., a computer operated by a customer) to generate constraints 140 for generated code 130. For example, the customer may be able to generate undocumented code using code generator 120 when the customer does not subscribe to a service. In contrast, the customer may be able to generate documented code (e.g., may be able to produce generated code 130 and constraints 140) when the customer subscribes to the service. The service may further provide additional capabilities to the customer, such as by providing constraint checking services that can be used to validate generated code 130 on new target 190, report generating capabilities that allow the customer to generate reports according to determined formats, audit services that allow a customer's code to be audited, etc.

In one implementation, service provider 1030 may provide services to the customer on a subscription basis. A subscription may include substantially any type of arrangement, such as monthly subscription, a per-use fee, a fee based on an amount of information exchanged between the provider and the customer, a fee based on a number of processor cycles used by the customer, etc.

Illustrative Embodiments

Two illustrative embodiments will be described in connection with FIGS. 11-19 to further illustrate uses for exemplary embodiments. In a first illustrative embodiment, an application may explicitly initialize all global memory used by generated code. For example, a product, such as Real-Time Workshop Embedded Coder (RTW EC) by The MathWorks of Natick Mass., may have a default mode that initializes global memory used by generated code. Certain implementations may include logic that sets global memory to zero. RTW EC may include user configurable options that eliminate global memory zero initialization so as to avoid the disadvantages of zero initializing global memory (e.g., zero initializing global memory may be expensive with respect to ROM usage). For example, RTW EC may not zero initialize global memory because a device may zero global memory during its boot process. Re-zeroing global memory in this instance using RTW EC may be redundant.

Figure 11:
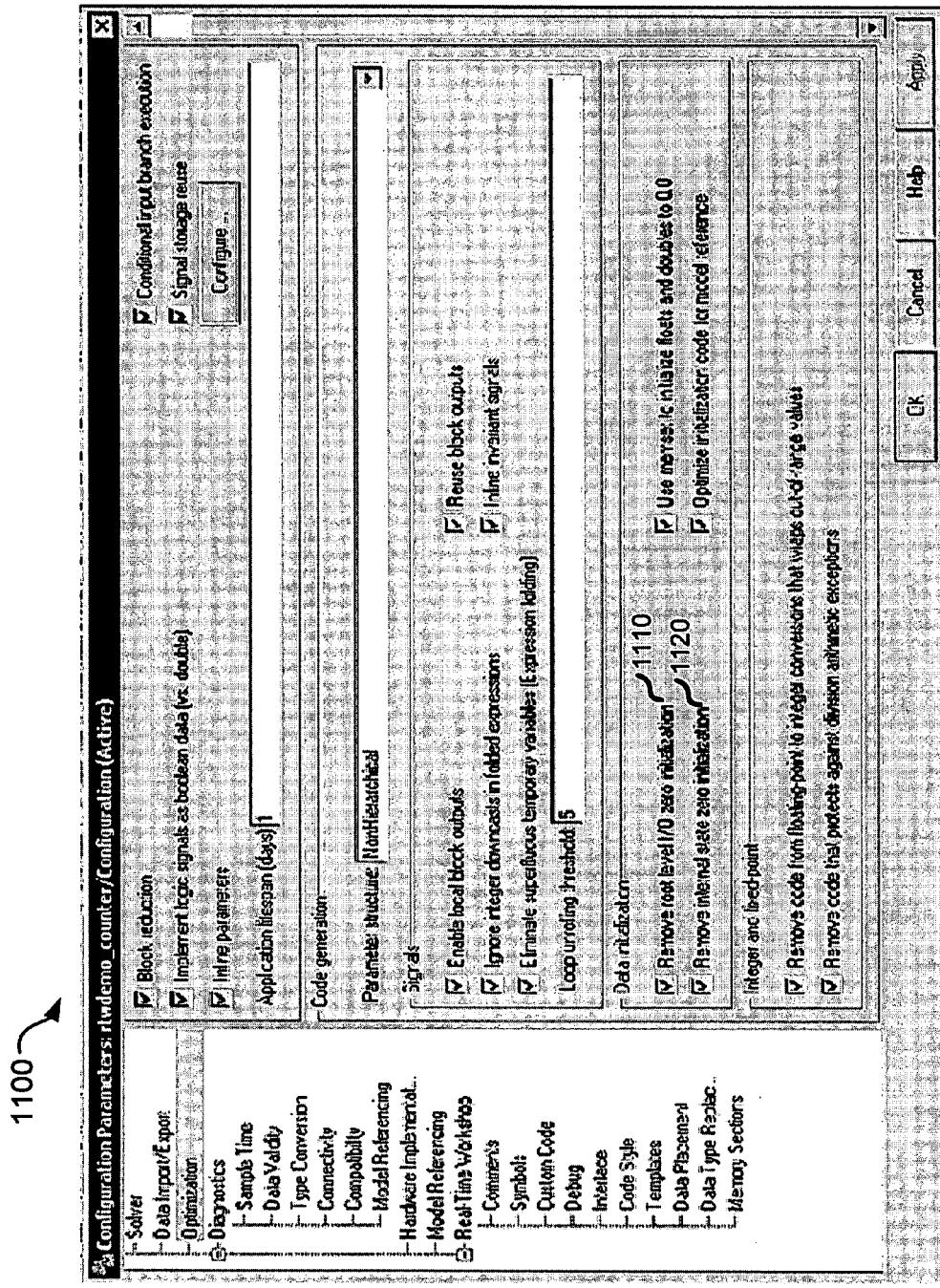
FIG. 11 illustrates an exemplary user interface that can be used to configure generated code.
Figure 12:
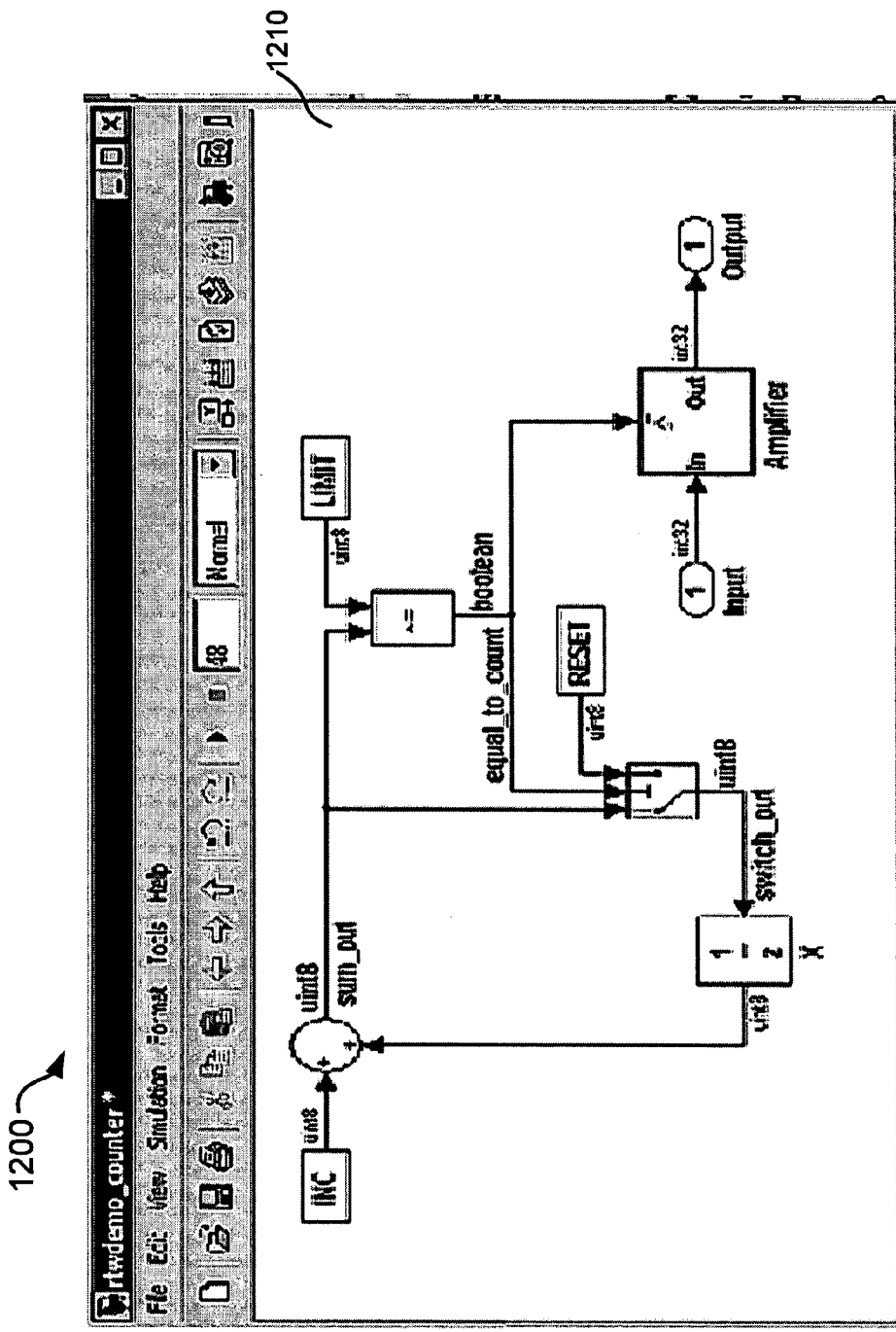
FIG. 12 illustrates an exemplary graphical model from which code can be generated using the user interface of FIG. 11.

A user may interact with a GUI to select optimizations, such as global memory initialization. For example, the user may be presented with GUI 1100 as illustrated in FIG. 11. GUI 1100 may let the user check or uncheck boxes using a pointing device, such as cursor 725. GUI 1100 may further let the user enter alphanumeric information via an input device, such as a keyboard. The user may select remove root level I/O zero initialization 1110 or remove internal state zero initialization 1120 (as evidenced by the lack of a check mark in the corresponding boxes for 1110 and 1120). The user may select OK when the user is satisfied with his/her selections.

The user may interact with GUI 1100 on behalf of a model, such as a graphical model, from which the user will generate code, such as C, C++, etc., code. For example, GUI 1100 may be associated with model 1200 illustrated in FIG. 12, where model 1200 is a graphical model of a physical system. In one embodiment, graphical model 1200 may be displayed on output device 970, which may be an LCD display. Model 1200 may include a model region 1210 in which blocks, or other graphical representations, are displayed.

The user may generate code from model 1200. For example, generated code 1300, illustrated in FIG. 13, may be generated from model 1200 based on a user input. In one embodiment, generated code 1300 may include a number of data structures, such as a block signals data structure, a block states data structure, etc.

Since the device on which generated code 1300 is run performs global memory initialization at boot time, generated code 1300 may be optimized by omitting, or turning off, logic in the generated code that would otherwise perform global memory initialization (e.g., logic associated with 1110 and 1120 of FIG. 11). For example, initialization code that is generated using RTW EC and that includes the optimization may be generated code 1400, which is illustrated in FIG. 14.

Figure 15:
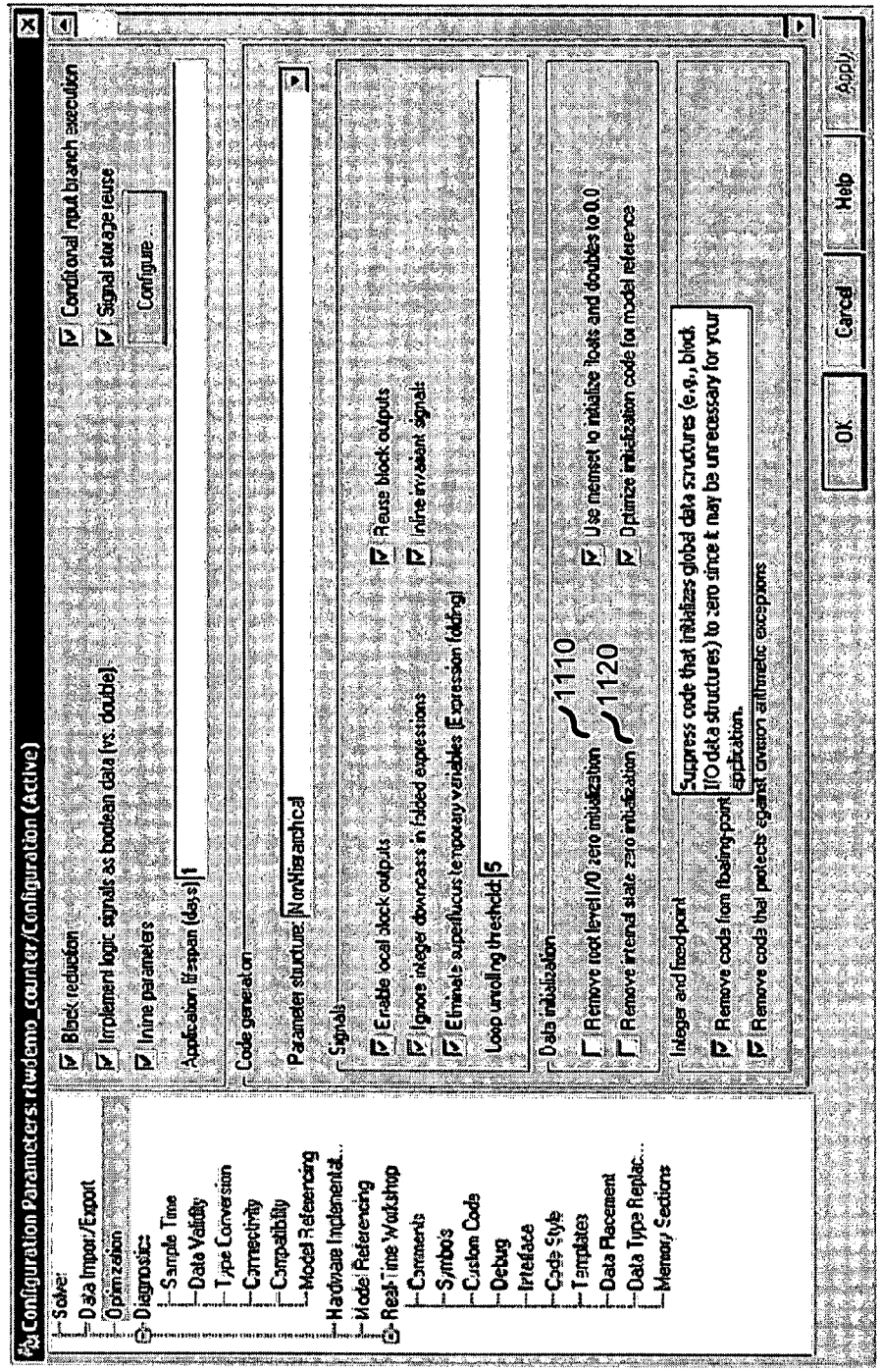
FIG. 15 illustrates an exemplary user interface that can be used to configure generated code for the graphical model of FIG. 12.
Figure 18:
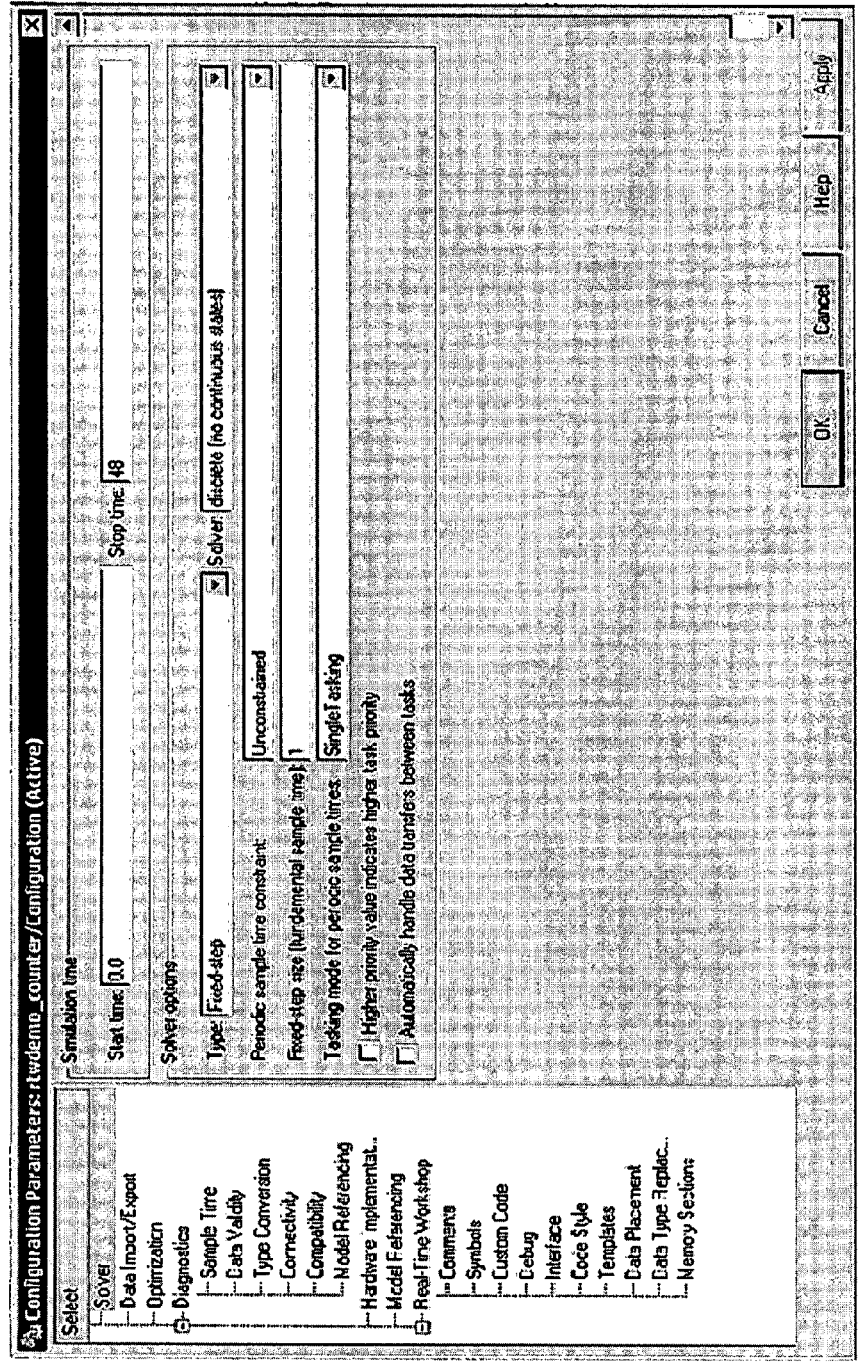
FIG. 18 illustrates an exemplary user interface that can be used to enter parameters for a model.

In an alternative embodiment, logic that initializes global memory may not be turned off, or omitted, when the user interacts with the RTW EC GUI. For example, FIG. 15 illustrates GUI 1500 which is substantially identical to GUI 1100 except that the check boxes associated with 1110 and 1120 are not checked (as evidenced by the empty check boxes for 1110 and 1120). Root level I/O zero initialization (1110) and internal state zero initialization (1120) code will not be removed from code generated using GUI 1500. The user may select OK when the user is satisfied with his/her selections in FIG. 15.

The user may generate code that includes additional code for initialization, namely root level I/O zero initialization and internal state zero initialization. FIG. 16 illustrates file 1600 that includes code generated using GUI 1500.

The exemplary embodiment of FIG. 15 may generate an independent executable file that can be used to self-diagnose generated code in file 1600. For example, file 1700, illustrated in FIG. 17, may include diagnostic code that can be used to validate an assumption used by a code generator when file 1600 was generated. For example, file 1700 identifies the assertion that the code generator made regarding the optimization for initializing memory. The user can call file 1700 prior to calling the initialization core to validate that the user has deployed generated code consistent with assumptions made by the user and later used by the code generator to generate code. Embodiments of file 1700 can dynamically validate generated code in file 1600 at runtime. In an alternative embodiment, file 1700 may statically validate generated code 130.

A second illustrative example, may include self-diagnostic code that validates sample time properties in generated code. For example, sample times associated with a graphical model, such as model 1200 may be implemented in generated code. For example, a step function in the model may be called once per second. A user may interact with a GUI, such as GUI 1800 in FIG. 18, to enter model parameters, such as the step function sample rate of 1 second. The user may select OK when he/she is satisfied with the parameters in GUI 1800.

The user may generate code for model 1200 using a code generator, such as RTW EC. The code generator may generate a file containing the generated code and a separate file containing self-diagnostic code. For example, RTW EC may generate file 1900 that includes a self-diagnostic function that validates the assumption made by the code generator with respect to the step function sample rate. The user may call file 1900 to validate generated code that includes the step function and/or the sample rate. For example, the code generator assumed that the step function code is executed once per second. The user can call file 1900 with each invocation of the step function in model 1200 to validate that the user has deployed generated code consistent with assumptions made by the code generator.

Exemplary Alternative Embodiments

Many alternative embodiments are possible based on the foregoing description. For example, a first alternative embodiment may generate constraints 140 when producing generated code 130, where constraints 140 includes a report. For example, system 100 may include a report generator that includes a number of report generating components that are used to generate reports according to one or more templates.

For example, an operator may indicate that constraints 140 should include information that identifies hot spots in generated code and a degree of confidence indicator for each hot spot that indicates a likelihood that a hot spot will not invalidate generated code. Code generator 120 may call the report generator when generating constraints 140. The report generator may use a hot spot component to collect and format the hot spot information, a confidence indicator component to compute and display confidence information, and a formatting component to format the report according to operator determined parameters.

A second alternative embodiment may generate a constraints document in which the content or format of a document portion varies based on the importance of a portion of generated code to which the document portion pertains. For example, generated code 130 may include a first portion that is critical to proper operation of target 150 and a second portion that is not critical to operation of target 150 (e.g., the second portion may control the contrast of a display). Constraints 140 may include a first document portion related to the first code portion and a second document portion related to the second code portion. In constraints 140, the first document portion may include highly detailed information about assertions, optimizations, etc., related to the first code portion. In addition, the first document portion may include links between all requirements in a specification and corresponding portions of generated code. In contrast, the second document portion may include over view information about the second code portion since the second code portion is not critical to the operation of target device 150.

A third alternative embodiment may include code generator 120 that may convert certain blocks associated with specification 110 into assertions and/or diagnostics. For example, a graphical model may use a block library that includes a first block that is converted to an assertion by code generator 120 and a second block that is used to identify a diagnostic function in generated code 130. Code generator 120 may create an assertion in generated code 130 based on the first block and may insert the diagnostic function into generated code 130 based on the second block.

A fourth alternative embodiment may implement TCE 1010 using one or more text-based products. For example, a text-based TCE 1010, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Scilab from The French Institution for Research in Computer Science and Control (INRIA); or Modelica or Dymola from Dynasim. The text-based TCE may support one or more commands that support code generation, constraints generation, constraints checking, etc.

A fifth alternative embodiment may implement TCE 1010 in a graphically-based TCE 1010 using products such as, but not limited to, Simulink®, Stateflow®, SimEvents™, etc., by The MathWorks, Inc.; VisSim by Visual Solutions; LabView® by National Instruments; Dymola by Dynasim; Extend from Imagine That Inc.; SoftWIRE by Measurement Computing; WiT by DALSA Coreco; VEE Pro or SystemVue by Agilent; SystemVIEW from Elanix, Vision Program Manager from PPT Vision, Khoros from Khoral Research, Gedae by Gedae, Inc.; Scicos from (INRIA); Virtuoso from Cadence, Rational Rose from IBM, Rhopsody or Tau from Telelogic; or aspects of a Unified Modeling Language (UML) or SysML environment. The graphically-based TCE may support code generation, constraints generation, constraints checking, etc.

A sixth alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another TCE may be MATLAB-compatible and may be able to use the array command, the array transpose command, or other MATLAB commands. For example, the language may use the MATLAB commands to perform distributed processing using target 150 and/or 190.

A seventh alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor performance of generated code 130, etc.).

An eighth alternative embodiment, a TCE, such as MATLAB, may store constraints in a file, such as a .mat, file when code is generated by code generator 120. The embodiment may use the .mat file to document generated code 130 or may convert the .mat file into another format, such as a format used by new target device 190. The embodiment may use an API to access information stored in the .mat file (e.g., to access header information, tags, data, etc.) and to write the accessed information out in a format that differs from the input format. For example, the embodiment may convert the .mat format into a .xml format. The API may read the .mat file, transform the information into an output format, and may output the transformed information into a file. Alternatively, the API may read the .mat file and may send the information to transforming logic (e.g., transforming code) where the transforming logic converts the .mat format into the .xml format. Embodiments, such as the eighth alternative embodiment, may store constraints in machine-readable formats that can be used by one or more devices. For example, constraints can be stored via an object in a TCE class.

A ninth alternative embodiment may generate real-time executable code that may include data structures and/or functions. Constraints 140 may be produced when the real-time executable code is generated by code generator 120 and may include information about an application component and a run-time interface component in the generated code. The application component may implement data and/or functions (e.g., data/functions implemented via blocks in a block diagram). The run-time interface component may be used for managing and/or supporting execution of the executable code on a target device, such as target 150 and/or 190. Constraints 140 may include information for the run-time interface component (e.g., a main program) that initializes data structures, installs and/or implements interrupt service routines, executes background loops, performs cleanup operations, etc. Information in constraints 140 may allow identification of portions of the application component and/or the run-time interface component (e.g., critical portions) in a way that lets a user quickly and/or accurate locate and/or diagnose code associated with the real-time executable code.

A tenth alternative embodiment may include a constraints document that can be in a human-readable or machine-readable format and that can include information about reentrant code (e.g., a reentrant function) and/or non-reentrant code (e.g., a non-reentrant function). The constraints document may include information that identifies whether a piece of code is reentrant or non-reentrant (e.g., by containing a flag with a first value for reentrant code and a second value for non-reentrant code). The constraints document may further include information that identifies how reentrant or non-reentrant code behaves (e.g., the constraints document may include information that indicates that the reentrant code should not modify a global variable, that inputs and/or outputs should be passed via arguments and/or return values, etc.). The constraints document may further include information that identifies code types based on a likelihood that the code may not operate in a determined manner. For example, it may be more difficult for a user to determine whether non-reentrant code operates in a desired manner when the non-reentrant code is contained in generated code. The constraints document may insert an indicator (e.g., a symbol) into a human-readable version of the constraints document to draw a user's attention to a piece of non-reentrant code (e.g., a non-reentrant function) so that the user is more likely to perform a careful evaluation of the non-reentrant code. The constraints document may further include information that can be used to test the reentrant code and/or non-reentrant code when desired.

An eleventh alternative embodiment may include a code generator that can receive constraints and/or assumptions from a specification, that can receive constraints and/or assumptions from a user, and that can generate its own constraints and/or assumptions. For example, the code generator may, or may not, generate its own constraints and/or assumptions when generating code on behalf of a user. These constraints may be incorporated into a constraints document alone or along with constraints and/or assumptions from the user and/or specification. For example, in one alternative embodiment, the code generator may generate constraints and/or assumptions that can operate with a scheduler that differs from a scheduler associated with a target device. For example, the code generator may operate with a first scheduler (e.g., a rate-monotonic scheduler, earliest deadline first scheduler, etc.) that operates with a current target device. The code generator may generate constraints and/or assumptions for the first scheduler. A later version of the code generator may generate code that can be used with a different scheduler. The earlier constraints document may be used to indicate that the earlier generated code can be used with the different scheduler when the different scheduler is, for example, a rate-monotonic scheduler.

A twelfth alternative embodiment may monitor thread safety in generated code. For example, generated code 130 may include a number of threads that run at the same time when generated code 130 is executed. For example, generated code 130 may control a number of processes where each process is associated with one or more threads. Further assume that the threads are supposed to operate independently (i.e., without interacting with other threads simultaneously running). The threads may operate correctly on target 150; however, a user may need to port generated code 130 to new target 190 where correct thread operation may not yet be known. Constraints 140 may include executable instructions that dynamically determine whether the threads interact with each other when run on new target 190. For example, the user may run constraint checker 180 and constraints 140 may be executed. Logic in constraints 140 may determine that none of the threads interact with each other when generated code 130 is run on target 190. Constraints 140 may generate a report for the user that indicates that all threads will operate in a desired manner on new target 190.

A thirteenth alternative embodiment may document generated code that is associated with industry specific or open source initiatives. For example, unified modeling language (UML) is a standardized specification language for object modeling. UML allows users to create abstract models of systems (such as software based systems). System modeling language (SysML) is a domain specific modeling language used in systems engineering and can support the specification, analysis, design, verification and validation of systems. Automotive open system architecture (AUTOSAR) is an open and standardized automotive software architecture jointly developed by automobile manufacturers, suppliers, and tool developers. AUTOSAR can serve as a platform on which future vehicle applications can be designed and/or implemented. UML, SysML, AUTOSAR, and other similar applications, can include electronic information (e.g., models, specifications, electronic documents, instructions, etc.). At times, it may be beneficial to generate code from UML, SysML, AUTOSAR, etc., compatible information. Exemplary embodiments can generate an executable document or a document that is partially executable that captures information about UML, SysML, AUTOSAR, etc., compatible information. The executable/partially-executable document can be used to validate information related to UML, SysML, AUTOSAR, etc., such as information in generated code.

Still other alternative implementations are possible consistent with the spirit of the invention.

CONCLUSION

Implementations may provide devices and techniques that document generated code.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 8A and 8B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1A, 1B, 2, 3A, 3B, 4, 9, and 10 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory computer-readable medium storing instructions, the instructions comprising:
one or more instructions that, when executed by at least one processor, cause the at least one processor to:
document an assumption in connection with an optimization made during code generation that produces generated code;
generate, based on the assumption, an executable constraints document,
the executable constraints document being separate from the generated code, and
the executable constraints document including:
first information about the assumption, and
second information about a target device on which the generated code will be run; and
execute the constraints document;
determine, based on executing the constraints document, that input data is out of bounds when the generated code is run on the target device;
identify that the assumption is associated with the input data being out of bounds;
determine a validation result for the optimization based on identifying the assumption; and
perform an operation based on the validation result, the operation including:
providing the validation result for display to a user,
storing the validation result,
sending the validation result to a destination, or
modifying the generated code.

2. The non-transitory computer-readable medium of claim 1, where the optimization is related to an operation associated with a safety critical application.

3. The non-transitory computer-readable medium of claim 1, where the assumption is related to a specification used for producing the generated code.

4. The non-transitory computer-readable medium of claim 1, where the generated code is originally created for a previous version of the target device that is different from a new version of the target device.

5. The non-transitory computer-readable medium of claim 1, where the executable constraints document further includes scheduling semantics and execution semantics.

6. The non-transitory computer-readable medium of claim 1,
where the generated code includes a reentrant function, and
where the executable constraints document further includes information that identifies the reentrant function.

7. The non-transitory computer-readable medium of claim 6, where the executable constraints document further includes executable code that tests the reentrant function.

8. The non-transitory computer-readable medium of claim 1, where the generated code includes a function having a formal argument or an actual argument.

9. The non-transitory computer-readable medium of claim 8, where the executable constraints document further includes third information that identifies the formal argument or the actual argument.

10. The non-transitory computer-readable medium of claim 8, where the executable constraints document further includes code that is used to test the function.

11. The non-transitory computer-readable medium of claim 1, where the executable constraints document further includes executable information that makes a determination with respect to interactions among threads in the generated code.

12. The non-transitory computer-readable medium of claim 1, where the optimization is validated at runtime.

13. The non-transitory computer-readable medium of claim 1, where the one or more instructions to determine the validation result further comprise:
one or more instructions that, when executed by the at least one processor, cause the at least one processor to:
determine thread safety with respect to one or more threads in the generated code, and
determine the validation result based on identifying the assumption and based on determining the thread safety.

14. The medium of claim 1, where the executable constraints documents is one of an automotive open system architecture (AUTOSAR) compatible document, a unified modeling language (UML) compatible document, or a system modeling language (SysML) compatible document.

15. A method comprising:
documenting an assumption or an assertion made in connection with an optimization in generated code;
generating a document based on the assumption or the assertion,
generating the document being performed by a device,
the document being separate from the generated code, and
the document including:
first information about the assumption or the assertion, and
second information about a target device on which the generated code will be run;
determining, based on the document, that input data is out of bounds when the generated code is run on the target device,
determining that the input data is out of bounds being performed by the device;
identifying that the assumption or the assertion is associated with the input data being out of bounds,
identifying that the assumption or the assertion is associated with the input data being out of bounds being performed by the device;
determining validation information, for at least a portion of functional code in the generated code, based on identifying that the assumption or the assertion is associated with the input data being out of bounds,
determining the validation information being performed by the device; and
performing an operation based on the validation information,
performing the operation being performed by the device, and
performing the operation including one or more of:
providing, for display, the validation information to a user,
storing the validation information in a storage device,
sending the validation information to a destination that performs another operation based on the validation information, or
modifying the generated code based on the validation information.

16. A computing device comprising:
a processor to:
generate an executable document that maps an assumption to an assertion associated with generated code,
the executable document being separate from the generated code, and the executable document including:
  first information about the assumption, and
  second information about a target device on which the generated code will be run;
determine, based on the executable document, that input data is out of bounds when the generated code is run on the target device;
identify that the assumption or the assertion is associated with the input data being out of bounds;
determine particular information regarding the generated code or the executable document based on identifying that the assumption or the assertion is associated with the input data being out of bounds; and
perform an operation based on the particular information,
  when performing the operation, the processor is to one or more of:
    provide the particular information for display,
    store the particular information in a storage device,
    send the particular information to a destination that performs another operation based on the particular information, or
    modify the generated code based on the particular information.

17. The computing device of claim 16, where the processor is further to:
operate a constraint checker on the generated code and on the executable document to validate the generated code,
  the particular information regarding the generated code or the executable document being further based on operating the constraint checker.

18. The computing device of claim 16, where the processor is further to:
generate a report or a checklist that includes information about the assumption or the assertion; and
provide the report or the checklist.

19. The computing device of claim 16, where the processor is further to:
send the generated code or the executable document to the target device or to another device.

20. A non-transitory computer-readable medium storing instructions, the instructions comprising:
one or more instructions that, when executed by at least one computing device, cause the at least one computing device to:
  receive a user input related to an assumption regarding code,
  generate, based on the user input, an executable constraints document,
    the executable constraint document being separate from the code,
    the executable constraint document mapping the assumption to an assertion in the code, and
    the executable constraints document including:
      first information about the assumption, and
      second information about a target device on which the code will be run;
  determine, based on the executable constraints document, that input data is out of bounds when the code is run on the target device;
  identify that the assumption is associated with the input data being out of bounds;
  determine particular information about the code based on the user input and based on identifying that the assumption is associated with the input data being out of bounds; and
  perform an operation based on the particular information,
    the one or more instructions to perform the operation including:
      one or more instructions that, when executed by the at least one computing device, cause the at least one computing device to one or more of:
        provide the particular information for display,
        store the particular information in a storage device,
        send the particular information to a destination that performs another operation based on the particular information, or
        modify the code based on the particular information.

21. The non-transitory computer-readable medium of claim 20, where the instructions further comprise:
one or more instructions that, when executed by the at least one computing device, cause the at least computing device to:
  provide, for display in a user interface, information in a specification associated with the code, a configuration file associated with the code, or the executable constraints document.

22. The non-transitory computer-readable medium of claim 20, where the particular information is displayed in a report or a checklist.

23. The non-transitory computer-readable medium of claim 20, where the instructions further comprise:
one or more instructions that, when executed by the at least one computing device, cause the at least computing device to:
  receive, from a user, configuration information for a code generator that generates the code, and
  configure the code generator based on the configuration information.

24. A system comprising:
a processor to:
  document an assumption or an assertion made in connection with an optimization in generated code;
  generate an executable constraints document for the generated code,
    the executable constraints document being separate from the generated code, and
    the executable constraints document including:
      first information about the assumption or the assertion, and
      second information about a target device on which the generated code will be run;
  determine, based on the executable constraints document, that input data is out of bounds when the generated code is run on the target device;
  identify that the assumption or the assertion is associated with the input data being out of bounds;
  determine a validation result, for at least a portion of the generated code, based on identifying that the assumption or the assertion is associated with the input data being out of bounds; and
  perform an operation based on the validation result, and
  when performing the operation, the processor is to one or more of:
    provide the validation result for display,
    store the validation result in a storage device,
    send the validation result to a destination that performs another operation based on the validation result, or
    modify the generated code based on the validation result.

25. The system of claim 24,
where the generated code is created for a first version of a particular device that is different from a second version of the target device, and
where, when generating the executable constraints document, the processor is to:
generate the executable constraints document based on information provided regarding the generated code during a creation of the generated code for the first version of the particular device.

* * * * *